(12) United States Patent
Fablet et al.

(10) Patent No.: US 8,949,207 B2
(45) Date of Patent: Feb. 3, 2015

(54) METHOD AND APPARATUS FOR DECODING ENCODED STRUCTURED DATA FROM A BIT-STREAM

(75) Inventors: Youeen Fablet, La Dominelais (FR); Hervé Ruellan, Rennes (FR); Romain Bellesort, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 12/964,659

(22) Filed: Dec. 9, 2010

(65) Prior Publication Data

US 2012/0150828 A1   Jun. 14, 2012

(51) Int. Cl.
  *G06F 17/30* (2006.01)
  *G06F 9/50* (2006.01)
(52) U.S. Cl.
  CPC ..................................... *G06F 9/505* (2013.01)
  USPC ............................. 707/696; 707/693; 707/694
(58) Field of Classification Search
  None
  See application file for complete search history.

(56) References Cited

U.S. PATENT DOCUMENTS

| 5,995,095 | A  | * | 11/1999 | Ratakonda | 715/255 |
|---|---|---|---|---|---|
| 2003/0078930 | A1 | * | 4/2003 | Surcouf et al. | 707/10 |
| 2006/0022848 | A1 | * | 2/2006 | Nomura | 341/50 |
| 2007/0237409 | A1 | * | 10/2007 | Atsumi et al. | 382/239 |
| 2007/0285286 | A1 | * | 12/2007 | Hussain et al. | 341/50 |
| 2009/0282317 | A1 | * | 11/2009 | Lapstun et al. | 714/769 |
| 2009/0287625 | A1 | * | 11/2009 | Fablet et al. | 706/45 |
| 2009/0323826 | A1 | * | 12/2009 | Wu et al. | 375/240.27 |
| 2010/0010995 | A1 | * | 1/2010 | Fablet et al. | 707/6 |
| 2010/0083101 | A1 | * | 4/2010 | Denoual et al. | 715/242 |
| 2010/0287460 | A1 | * | 11/2010 | Denoual et al. | 715/234 |
| 2011/0010614 | A1 |   | 1/2011 | Fablet et al. | |
| 2011/0051865 | A1 | * | 3/2011 | Mergen et al. | 375/347 |
| 2011/0052052 | A1 | * | 3/2011 | Hayashi | 382/166 |

* cited by examiner

*Primary Examiner* — Mohammad S Rostami

(74) *Attorney, Agent, or Firm* — Canon USA, Inc. IP Division

(57) ABSTRACT

A method for decoding encoded structured data from a bit-stream comprising a plurality of encoded data units having the steps of, obtaining unit information comprising positions of the encoded data units within the bit-stream, retrieving the encoded data units from the bit-stream based on the unit information, creating decoding tasks for decoding the retrieved encoded data units, assigning the created decoding tasks to cores of a multi-core decoder, based on estimated decoding costs of the encoded data units, running the tasks on their assigned cores to decode the encoded data units in parallel is disclosed. It is applied to the decoding of XML documents in the EXI format.

20 Claims, 11 Drawing Sheets

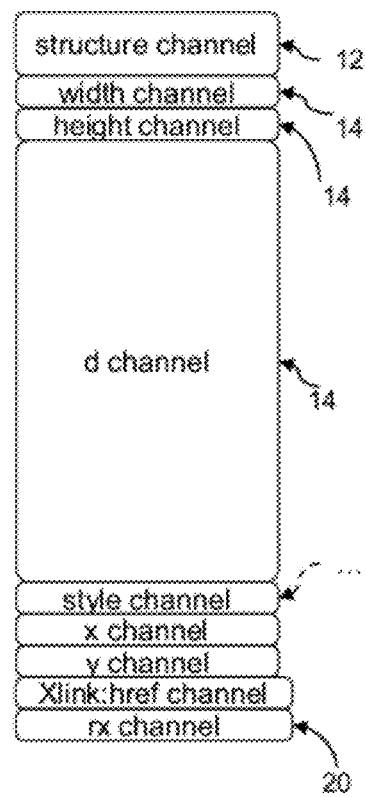

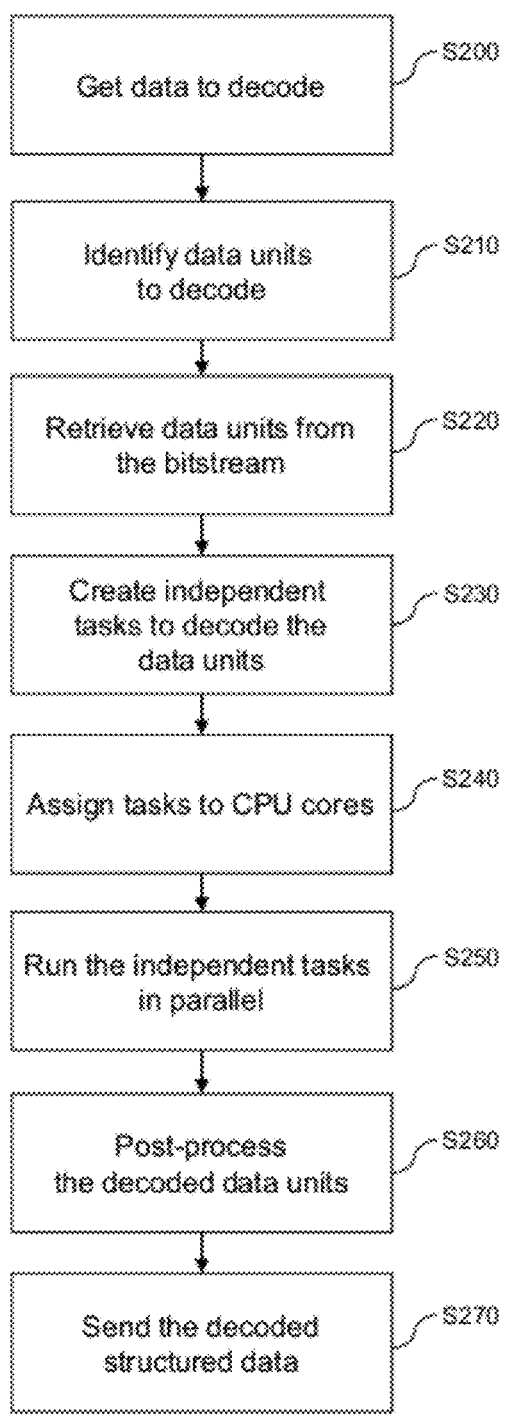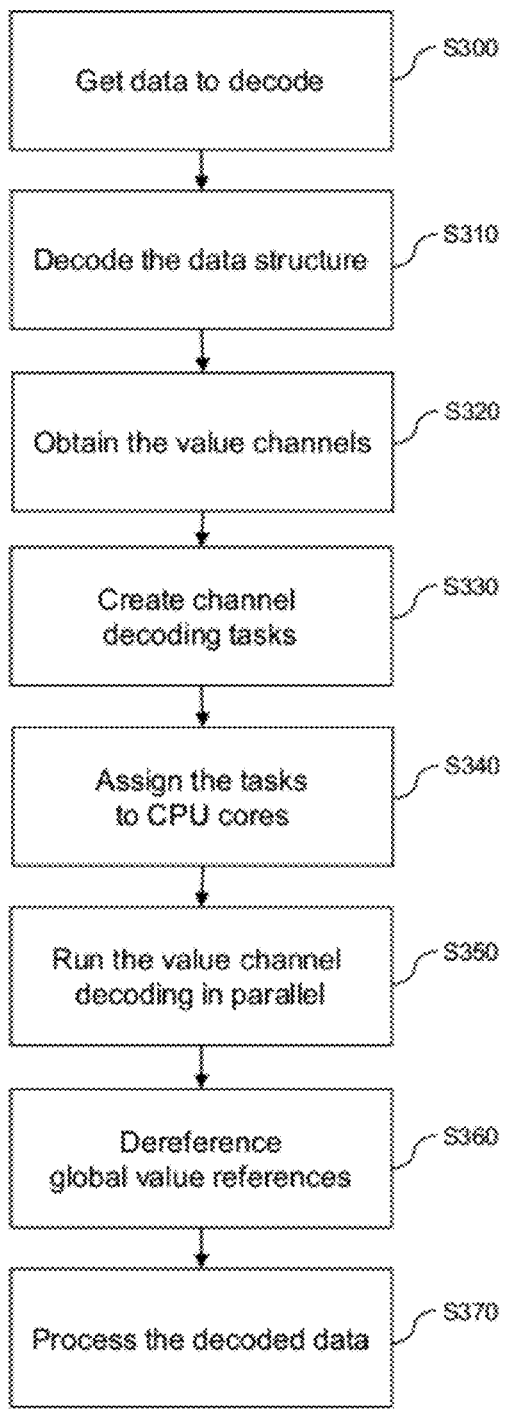

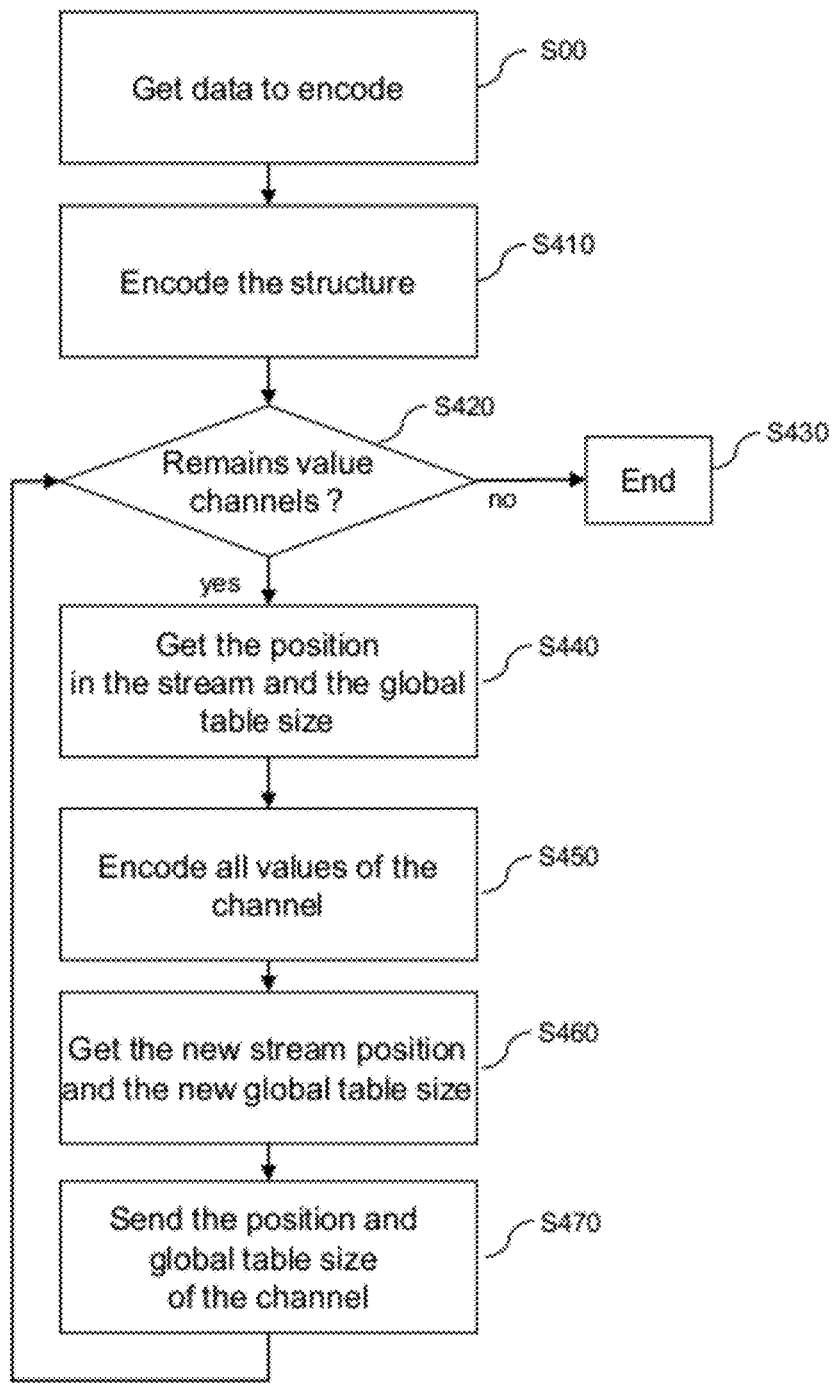

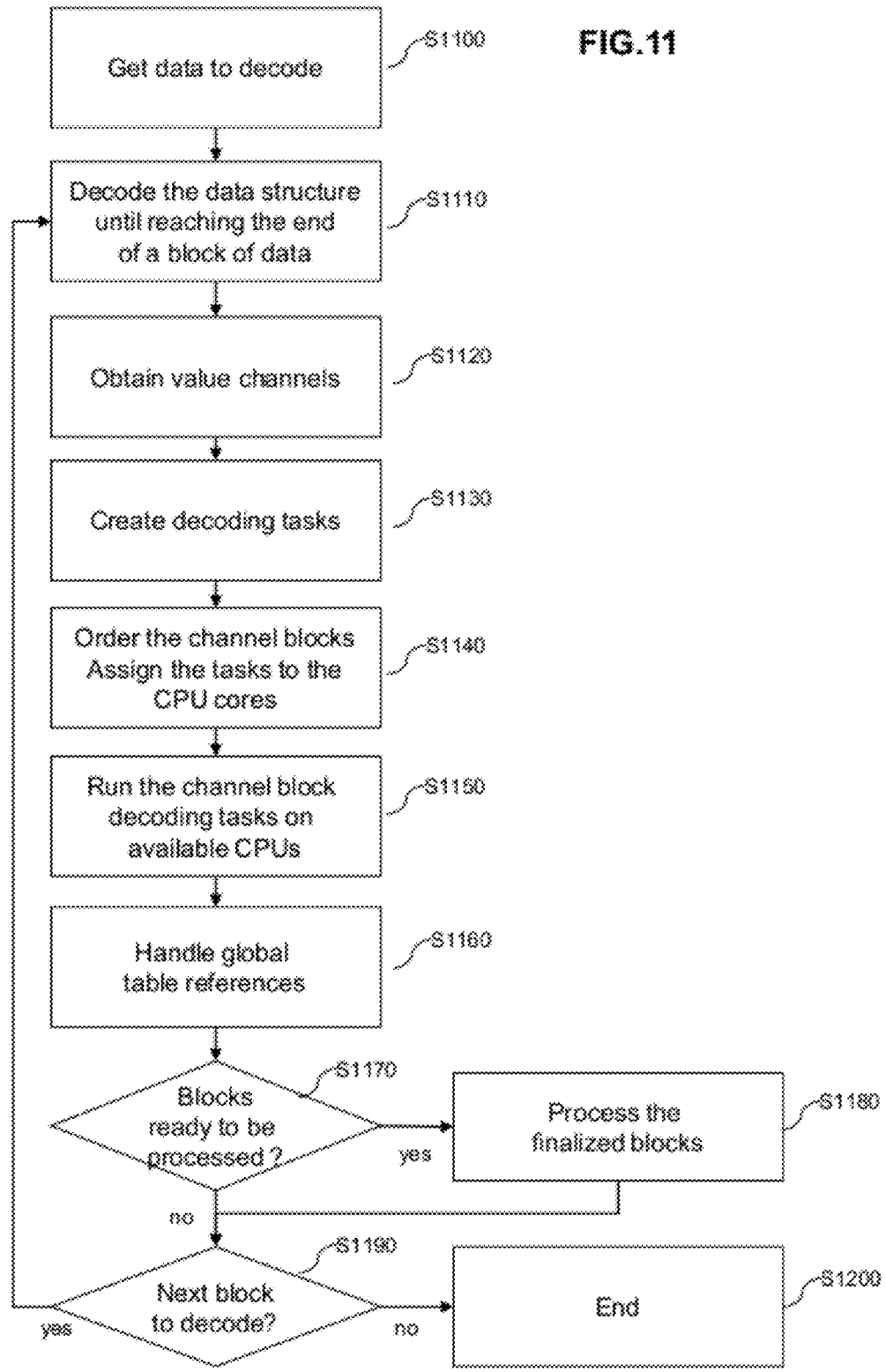

METHOD AND APPARATUS FOR DECODING ENCODED STRUCTURED DATA FROM A BIT-STREAM

BACKGROUND OF THE INVENTION

1. Field of the Invention

The present invention relates to a method for decoding encoded structured data from a bit-stream and a corresponding decoder, using in particular a multi-core system.

A particular but non-exclusive application of the present invention is the decoding of an EXI (standing for "Efficient XML Interchange") bit-stream obtained from the encoding of a structured document such as an XML file (standing for "extensible Markup Language.

2. Description of the Related Art

The XML (standing for "Extensible Markup Language") format is a syntax for defining computer languages, which makes it possible to create languages adapted to different uses which may however be processed by the same tools.

An XML document is composed of elements, each element being delimited by an opening tag (or start tag) comprising the name of the element (for example: <tag>) and a closing tag (or end tag) which also comprises the name of the element (for example </tag>). Each element may contain other elements in a hierarchical child-parent relationship and/or contain text data defining content. Given these structural tags, data in such a document is referred to as "hierarchized structured data".

The definition of an element may also be refined by a set of attributes, each attribute being defined by a name and having a value. The attributes are then placed in the start tag of the element they are refining (for example <tag attribute="value">).

XML syntax also makes it possible to define comments (for example: "<!--Comment-->") and processing instructions, which may specify to a computer application what processing operations to apply to the XML document (for example: "<?myprocessing?>").

Several markup languages based on the XML language may contain elements with the same name. To allow several different languages to be mixed in the same document, an extension of the XML language has been specified to define "Namespaces" for XML. Using this extension, two elements are identical only if they have the same name (also named "local-name") and are located in the same namespace.

A namespace is defined by a URI (standing for "Uniform Resource Identifier"), for example "http://canon.crf.fr/xml/mylanguage". The use of a namespace in an XML document is via the definition of a prefix which is a compact representation of the URI of the namespace. The prefix is defined using a specific attribute (for example "xmlns:ml="http://canon.crf.fr/xml/mylanguage" binds the prefix "ml" to the URI "http://canon.crf.fr/xml/mylanguage"). Next, the namespace of an element or of an attribute is specified by preceding its name with the prefix associated with the namespace followed by ":" (for example "<ml:tag ml:attribute="value">" indicates that the element "tag" arises from the namespace ml and that the same applies for the attribute "attribute").

These above features identifying a specific element or an attribute are called "qualified name" (or "qname" according to the EXI recommendation). Thus, a qualified name groups together the local name of the element or attribute (for example "tag"), possibly a URI (for example "xmlns:ml="http://canon.crf.fr/xml/mylanguage") and possibly a prefix (for example "ml"). A qname uniquely identifies a type of structural XML data. Several occurrences of the same qname element may then occur in the XML data, usually with different values.

In XML terminology, the set of the terms "element", "attribute", "text data", "comment", "processing instruction" and "escape section" are grouped together under the generic name of "item".

Hierarchized structured data incorporates two types of information: a first type of information defining the structure of the data and a second type of information defining the actual content of the data.

The pieces of information of the first type, termed "structural information", are all pieces of information which serve for hierarchizing the data, for example defined by an item type (through a qname). The pieces of information of the second type, termed "content information", represent the values or the instances taken by the data.

By way of illustration, for an element containing text data such as <element>example</element>, the start tag <element> of the element and the end tag </element> are structural information, whereas the string "example" is content information.

The link between the pieces of structural information and the pieces of content information depends on the language used for hierarchizing the data. However, generally, a document containing hierarchized structured data may be seen as a set of "items" organized as a "tree". The content information corresponds to the leaves of the tree (element content and attribute values) while the structure information corresponds to the nodes and links between nodes in the tree (elements and attributes names, type of the nodes and child/parent relationships of the nodes).

As shown above, the XML items may be described in terms of events, also called XML events. Thus, there are XML events relating uniquely to a piece of structural information such as the start tag and the end tag, and there are XML events comprising content, for example the attributes or the text data of the elements or comments.

For the needs of illustration below, the following notations will be used for the XML event structural information:
 SE: start tag event;
 EE: end tag event;
 ATTR: attribute event;
 CH: character or text event.

The content information consists for example of the ATTR and CH event values. To process an XML document, it must be read from memory.

A first family of reading approaches consists in reading the XML data as a sequence of events, processing one event at a time. The methods of this family, such as for example the SAX API (standing for "Simple API for XML"), allow reading of the XML document by streaming, enabling use of little memory space. However, these approaches do not provide easy access to any desired part of the data.

A second family consists in representing the whole XML data in memory as a tree, such as the DOM API (standing for "Document Object Model"). The methods of this family generally enable easy and fast access to each part of the XML document. However, it requires a large amount of memory to store all the data simultaneously.

Access to an XML document generally requires parsing the XML events in order to identify structural information and content information.

Although the present invention as set out below applies to any type of document in XML format, it is particularly advantageous with XML formats such as SVG, Open Office, Open Document Format, PDFXML or XPS which generally provide an organization of the documents by section or page and are generally very voluminous.

The SVG format is an XML-based format for data designed to describe sets of vector graphics. The Open Office format and the Open Document Format are XML-based formats designed for storing electronic documents such as word processor, presentation or spreadsheet documents. The PDFXML format is an XML-based format for describing pages which enables preservation of the formatting of the original document. The XPS format is an XML-based format used to describe documents to be printed.

XML documents in such formats tend to be large. The present invention is particularly directed to decoding such large documents that have been previously encoded.

XML has many advantages and has become a reference language for storing data in a file or for exchanging data. XML in particular provides access to numerous tools for processing the files generated. Moreover, an XML document can be edited manually with a simple text editor. In addition, as an XML document contains its structure integrated in the data, such a document is highly legible even without knowing its specification.

However, the main drawback of XML syntax is to be verbose. This means that the size of an XML document may be several times greater than the intrinsic size of the raw data. This large size of XML documents also gives rise to a long processing time when XML documents are generated and read. It also leads to a long transmission time.

To remedy these drawbacks, methods of compressing and encoding an XML document have been sought. The aim of these methods is to encode the content of an XML document in a more efficient form, while enabling the XML document to be reconstructed easily. This is in particular the case for the Binary XML formats that produce binary bit-stream.

The simplest binary way to encode XML data is to encode markup information using a binary format instead of a text format. This has been improved by eliminating or decreasing redundancy in markup information, for example by avoiding specifying the name of the element in both the start tag and the end tag. Such mechanisms are used in all Binary XML formats.

More advanced mechanisms, such as some involved in EXI and Fast Infoset formats, use one or more indexing tables for encoding and decoding XML data, for example string tables or "partitions" as defined in the EXI recommendation. These indexing tables are very efficient when encoding repeated strings such as item names.

In practice, on the first occurrence of a repeated name, it is encoded literally as a string and an index is associated with it in a corresponding entry of the table. The indexes are incremented each time, and later coded over the fewest number of bits adapted to represent all the N indexes of the table (i.e. ? log 2(N)? bits).

Next, on each further occurrence of that name, it is encoded using the index of the associated entry, instead of the full string. This allows the size of the encoded document to be reduced, but also allows the parsing speed of the document to be increased.

In the EXI format, there is a global indexing table that comprises all the string values indexed and that is shared by the entirety of the XML data, and there is a plurality of local indexing tables. Every new index created in a local indexing table is simultaneously created in the global indexing table.

Each local indexing table comprises the string values of items having the same qname type, i.e. of items having the same specific name. A local indexing table associated with a qname is thus used for indexing the content of the qname item (for example an attribute value, an element content, etc.).

For the purpose of illustration, on the first occurrence of a child element in the content of a given element, a new entry is added to the local indexing table (associated with the given element) to describe that child element. Further occurrences of a similar child element are described using the associated index. Local indexing tables generally produce shorter codes than the global value tables. A string value can only be assigned to one local indexing table.

In some embodiments aiming at limiting the memory used by indexing tables, a bounded table feature is specified that limits the number of indexed values. In this case, once the limit is reached, the oldest entry is removed (from the global and local tables) and the index of the oldest entry is assigned to the new string value.

EXI format also uses grammars (tables) and productions to provide priority codes for encoding the structural information of XML data, the shorter codes being assigned to the more probable structure information. A detailed overview of these grammars and productions may be obtained from the EXI recommendation.

Grammars, local and global indexing tables generally evolve progressively with the encoding or the decoding of the XML data. The evolution of processing of these tables is similar during encoding and decoding. This means that, at the same point in the XML data, the tables must be the same whatever the encoding or the decoding in course. It may be noted that the grammars may also be built from the knowledge of an XML Schema.

Content information encoding parameters may also be selected according to the knowledge of the XML Schema that allows a type to be assigned to each XML value. For example, encoding types have been designed to represent integers, floats, strings, etc. On the other hand, without an XML Schema, the values are all given a string type.

XML values of string type can be represented, in a coded form, using indexes of indexing tables, such as EXI global or local indexing tables as introduced above, that are progressively built during the encoding and decoding processing.

XML schema (of which a description may be found at the addresses: http://www.w3.org/TR/xmlschema-1/ and http://www.w3.org/TR/xmlschema-2/) is a language which defines the types of data present in an XML document. A document written in XML schema constitutes like a "directory" of the types of data authorized and a structural model for all the XML documents conforming to that schema. This may concern the integer, float, or string type of a value, but also a qname type of structural information. An XML Schema may be used by both the encoder and the decoder to create the tables before processing the data.

Generally, using an XML Schema leads to improved compression of the structure since no learning is actually needed and codes obtained from schema-informed grammars are generally shorter than codes from learned grammars. For instance, schema-informed grammars produce shorter codes for a sequence of four mandatory elements (0 bit for each element ? all predictable) than the learned grammar counterpart (2 bits for each element as learned grammars are modelled as a choice).

In addition, the schema knowledge makes it possible to give a type to the XML values and to use specific encoding types that are generally more compactly encoded than the default string encoding. For instance, Boolean values can be represented as 1 bit while their default string representation will be at least on 16 bits.

In order to further improve the compression, two modes have been set up for EXI coding that provide another organization for the coded information within the EXI bit-stream generated: a mode referred to as "pre-compression" and a mode referred to as "compression", which are distinguished from each other by the sole additional implementation for the "compression" mode of a final lossless compression algorithm, for example of DEFLATE type.

Both modes use rearrangement of the XML data in the EXI bit-stream. Rearrangement reduces entropy of the data by grouping together similar information, and thus better compression of the XML data is obtained.

This involves:
grouping the XML event structure information, while keeping the original order of the original XML data, to obtain a structure channel,
grouping the XML event content information (values, names, etc.) having the same qname to obtain a plurality of value channels corresponding to a plurality of qname items. In each value channel, the values are kept in the original order of the values in the original XML data,
putting the value channels in order according to the structural information (i.e. the structure channel), that is to say in the order of the first occurrences in the original XML data of the associated qnames,
encoding the structure channel (using the priority codes for the structure channel) and then the value channels in the resulting order. The values are encoded one after the other in each value channel, and the value channels are encoded one after the other. For each value channel, a local indexing table is used to index string values.

In the "compression" mode, a compression of DEFLATE type is then carried out on each of the structure and value channels so obtained, with the optional setting up of strategies for grouping channels together (essentially for values) depending on their size (in number of values).

As for the "pre-compression" mode, this only re-organizes the data by channels as explained above, resulting in interleaved data. This "pre-compression" mechanism is illustrated using the SVG document 10 represented in FIG. 1A.

FIG. 1B represents the structure channel 12 thus obtained, using the notation introduced earlier.

FIG. 1C presents the order of the different value channels 14 so obtained, i.e. successively the channels having to the qualified names width, height, d, style, x, y, xlink:href and rx.

The order of the values in these channels is that shown in FIG. 1D, and corresponds to the order of the values in the XML document for each channel, these channels themselves being put in order as in FIG. 1C.

As represented in FIG. 1E, the EXI coding of the document in FIG. 1A generates an EXI bit-stream 20 comprising, first of all, the structure channel 12 including the priority codes defined by the grammars, then the value channels 14 in the order defined in FIG. 1D. The exact encoding of each value is defined by the EXI recommendation: by default, the values are encoded as strings of characters using global and local indexing tables.

It is to be noted that the global indexing table evolves during the encoding of each successive value channel, to receive at least each new string value that is added to a local indexing table.

Decoding an EXI bit-stream 20 uses the same mechanisms, i.e. first decoding the structure channel and then decoding each of the value channels in the same order. The global and local indexing tables are created in a similar way to that during the encoding.

With the recent advent of multi-core CPUs, parallel approaches to processing XML data, whatever their form, for example an EXI bit-stream or an XML file, are becoming attractive.

A parallel approach appears to be very efficient for processing large documents, in particular EXI bit-streams for which the decoding time is long. The approach is even more attractive for highly compressed EXI bit-streams resulting from the EXI (pre) compression mode since their decoding is even more demanding in terms of resources and decoding time.

Sharing the decoding of a highly compressed EXI bit-stream amongst several cores of a multi-core decoder is not an easy matter.

One may note that it is all the more difficult since, given the above construction of highly compressed EXI bit-streams, the encoded channels comprise interleaved data.

In this respect, it is not easy to obtain units in the bit-stream that may be considered as independent enough for parallel processing which requires independent decoding tasks.

This raises several difficulties. A first difficulty lies in the identification of the positions of "independent-sufficient" units within the bit-stream.

Another difficulty concerns the relationships between different parts of the EXI bit-stream that result from indexing data of those parts using the same global indexing table. Such relationships appear to be contrary to independency of those parts or units. During mono-task decoding, the indexing tables are progressively created, with all the information required each time for decoding the next piece of encoded data. However, during parallel decoding, this is no longer the case.

A further difficulty is to use each CPU core appropriately, i.e. to produce an even workload or the like amongst the CPU cores.

Therefore it would be desirable to provide efficient parallel decoding of encoded structured data in a multi-core decoder.

SUMMARY OF THE INVENTION

According to an aspect of the present invention, a method for decoding encoded structured data from a bit-stream comprising a plurality of encoded data units comprising the steps of, obtaining unit information comprising positions of the encoded data units within the bit-stream, retrieving the encoded data units from the bit-stream, based on the unit information, creating decoding tasks for decoding the retrieved encoded data units, assigning the created decoding tasks to cores of a multi-core decoder, based on estimated decoding costs of the encoded data units, and running the tasks on their assigned cores to decode the encoded data units in parallel, is disclosed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A to 1E illustrate the encoding mechanisms for structured data according to the techniques of the state of the art.

FIG. 2 illustrates, with a flow diagram, general steps of a parallel decoding method according to the invention;

FIG. 3 illustrates, with a flow diagram, general steps of a parallel decoding method for an EXI bit-stream, according to an embodiment of the invention;

FIG. 4 illustrates, with a flow diagram, steps for computing the unit information according to the invention, at the encoding side;

FIG. 11 illustrates, with a flow diagram, steps of a parallel decoding of a bit-stream, using a by-block approach according to the invention; and

DESCRIPTION OF THE EMBODIMENTS

Figure 1F:
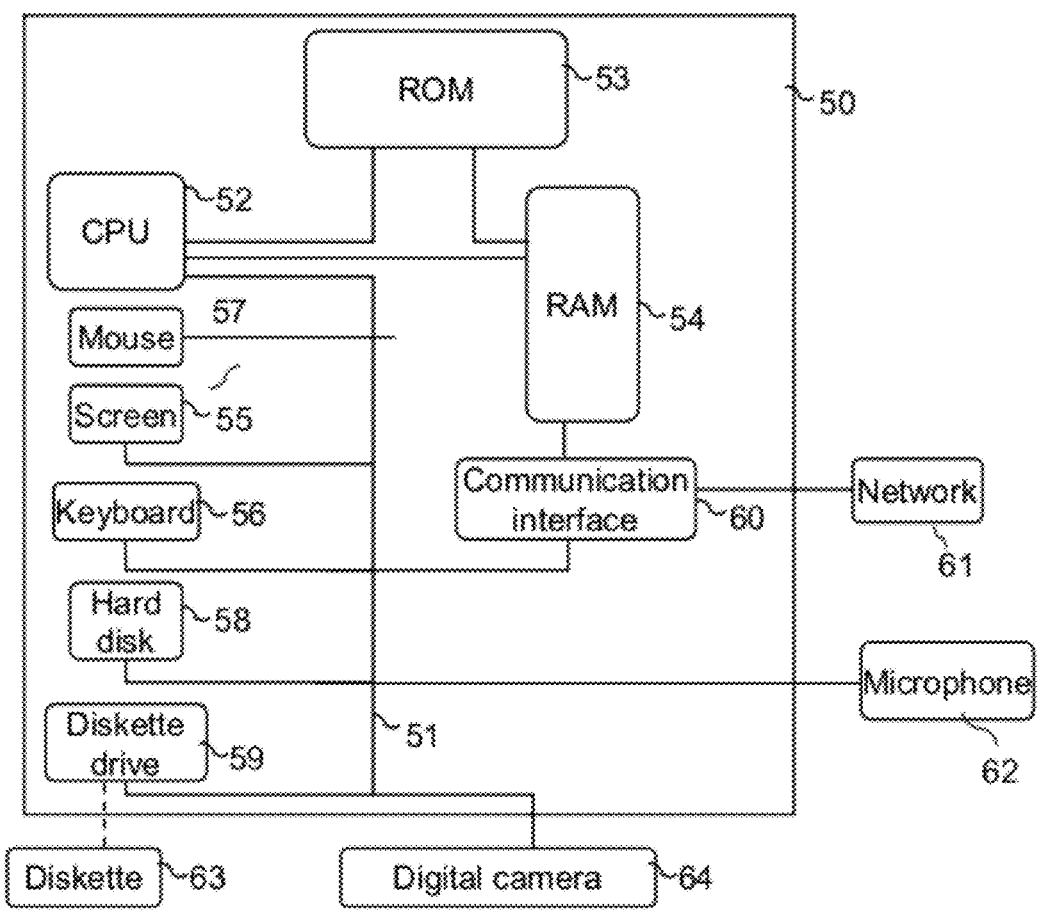
FIG. 1F shows a particular hardware configuration of a device adapted for an implementation of the method or methods according to the invention.

Various exemplary embodiments, features, and aspects of the invention will be described in detail below with reference to the drawings.

To that end, a first aspect of the invention relates to a method for decoding encoded structured data from a bit-stream comprising a plurality of encoded data units, the method comprising:
- obtaining unit information comprising positions of the encoded data units within the bit-stream;
- retrieving the encoded data units from the bit-stream, based on the unit information;
- creating decoding tasks for decoding the retrieved encoded data units;
- assigning the created decoding tasks to cores of a multi-core decoder, based on estimated decoding costs of the encoded data units;
- running the tasks on their assigned cores to decode the encoded data units in parallel.

As illustrated later on, this method may apply to an EXI bit-stream resulting from a (pre)compression mode coding, where the data units are formed by the value channels.

According to the invention, the data units structuring the bit-stream are chosen to create the tasks. One resulting advantage of the invention is an increased independence of the tasks for better parallel decoding.

According to the invention, a decoding cost of each data unit is estimated to appropriately assign the data units to the decoding tasks. Efficient scheduling of the tasks for parallel decoding may therefore be achieved, in particular to overcome the fact that some decoding tasks may require a long decoding time and thus overload some CPU cores while under-using other CPU cores.

One embodiment of the invention further provides an assignment of the created decoding tasks to the cores that is made in decreasing order of the estimated decoding costs, so that the most demanding tasks are decoded first.

One advantage of this embodiment is that it favors decoding the data units that are the most demanding in decoding time first, thus allowing an efficient sharing of CPU core workload by appropriately scheduling the less demanding tasks.

Another embodiment of the invention further provides decoding of an encoded data unit that comprises resolving indexing references to entries of an indexing table, said indexing table being specific to said encoded data unit. This means that the indexing table is not dedicated to or associated with another encoded data unit of the bit-stream. As an example, this may concern the local indexing table of the EXI format for the data units formed by the value channels.

This embodiment provides very efficient parallel decoding since the use of indexing tables specific to each encoded data unit increases independency of the units from each other.

Another embodiment of the invention further provides decoding of an encoded data unit that comprises resolving indexing references to entries of an indexing table, and further comprises, after decoding the encoded data units, post-processing the encoded data units to resolve indexing references unresolved during the decoding of the encoded data units.

One advantage of this embodiment is that parallel decoding may be performed on data units or tasks that are not completely independent from each other. Most of time, remaining unresolved relationships concern global indexing, the index and string value of which are resolved during decoding of another data unit. Post-processing enables this later resolution to be used to resolve unresolved indexing references.

A further embodiment of the invention further provides encoded data units that are value channels of an EXI bit-stream, and a step of obtaining unit information that comprises decoding a data structure channel of the bit-stream to identify the value channels in the bit-stream and obtaining a bit-size of indexing references comprised in the encoded data units, the indexing references making reference to entries of an indexing table.

One advantage of this embodiment is that the value channels (i.e. the data units) can be identified and localized at low costs, using the sole structure channel provided by the EXI format.

Still another embodiment of the invention further provides decoding a data structure channel of the bit-stream to identify a block of structured data, for example a section of the structured data between a specified start tag and end tag pair, for instance a page, and decoding the encoded structured data corresponding to the identified block,
- wherein decoding the encoded structured data corresponding to the identified block comprises the steps of obtaining, retrieving, creating, assigning and running,
- wherein said assigning is based on estimated block decoding costs for decoding the data of the encoded data units corresponding to the identified block, and decoding the encoded data units comprises solely decoding the data of the encoded data units corresponding to the identified block.

In this embodiment, only the necessary information is required to be decoded for each block. One advantage of this embodiment is that each block (e.g. each page) is decoded more quickly, while allowing parallel decoding of the next block to be started.

A second object of the invention relates to a device for decoding encoded structured data from a bit-stream comprising a plurality of encoded data units, the device comprising a computer system to carry out the steps of:

obtaining unit information comprising positions of the encoded data units within the bit-stream;

retrieving the encoded data units from the bit-stream, based on the unit information;

creating decoding tasks for decoding the retrieved encoded data units;

assigning the created decoding tasks to cores of a multi-core decoder, based on estimated decoding costs of the encoded data units;

running the tasks on their assigned cores to decode the encoded data units in parallel.

A third object of the invention relates to an information storage means, able to be read by a computer system, comprising instructions for a computer program adapted to implement the decoding method as set out above, when the program is loaded into and executed by the computer system.

A fourth object of the invention relates to a computer program product able to be read by a microprocessor, comprising portions of software code adapted to implement the decoding method as set out above, when it is loaded into and executed by the microprocessor.

The decoding device, information storage means and computer program have features and advantages that are analogous to the decoding method.

General steps of a decoding method according to the invention are illustrated in FIG. 2. The steps, like other steps described below with reference to other figures, may be implemented through computer code instructions of a computer program product, when the instructions are executed by a processor of a decoder. These instructions may be provided on an information storage means, such as a hard drive or a removable memory storage medium.

The input of the method is at least a bit-stream 20 of encoded structured data to be decoded, the bit-stream comprising a plurality of encoded data units. The output is corresponding decoded data.

According to the invention, some steps of decoding operations for decoding data units are performed in parallel for several data units of the bit-stream.

In a first step S200, a decoder, a generic structure of which is illustrated below in reference to FIG. 1F, receives the bit-stream of encoded structured data to be decoded.

To perform efficient parallel decoding of the bit-stream, the decoder identifies parts in the data. To that end, in a step S210, the decoder obtains information, also named "unit information" UI, corresponding to positions P of the encoded data units within the bit-stream. Such data units may be the value channels 14 as illustrated in FIG. 1E.

As shown below, this unit information contributes to obtaining appropriate encoded data units that can be run using independent decoding tasks.

This unit information UI typically contains the position in the bit-stream where to start the independent decoding since data units in a bit-stream are liable to present good independency properties. As a variant, this may be the number of bytes or entries in each data unit, since the position and the number of bytes are closely related to each other.

This unit information UI may also contain additional information, such as parameters for each data unit that are useful for the decoding of the corresponding data unit. As an example, this may be information for indexing a string: the bit size of the global index used at the beginning of each value channel in an EXI bit-stream, as illustrated below. As a variant to the bit size, this may be the number of literal strings to be decoded in the data units, since this number is also closely related to the bit size.

The unit information UI is available to the decoder for processing the bit-stream. This may be either transmitted by the encoder to the decoder within or outside the bit-stream (resulting for example from the encoding of the corresponding XML data 10) or may be stored, for easy use, as the result of previous parsing or decoding of the same bit-stream by the decoder. Availability of this unit information avoids a costly pre-processing of the data bit-stream at each execution of the invention.

When it knows the positions of the data units 14 in the bit-stream 20, the decoder may retrieve the encoded data units from the bit-stream, based on the unit information UI, at step S220.

In step S230, the decoder creates decoding tasks T for decoding the retrieved encoded data units. To achieve the purpose of the invention, these decoding tasks have to be as independent one from the other as possible. Since data units may not be totally independent from each other, some mechanisms to resolve non-decoded dependencies may be implemented as disclosed below in the case of unresolved references when decoding a given data unit. Thanks to these mechanisms, the tasks may then be seen as independent tasks.

A decoding task is created for each retrieved data unit. However, using the unit information, several data units may be grouped within the same task (for example if the units are small). Likewise, a data unit may be split into several tasks if big. Typically, these tasks will be run on their own thread.

Following step S230, step S240 consists in assigning the created decoding tasks T to cores of a multi-core decoder, based on estimated decoding costs EDC of the encoded data units. This step may use a scheduler that assigns the various created decoding tasks or corresponding threads to the cores, in an order that favours efficient parallel decoding and an even workload of the CPU cores.

This order is particularly based on the estimated decoding costs, because this is more efficient to first decode the most demanding tasks. As a consequence, the scheduler will intend to assign first the most demanding tasks to the CPU cores, and then to enqueue the less demanding tasks. In practice, for each idle/available CPU core (because it has ended processing of a previous task), the most demanding task that remains is sent to this CPU core for processing.

Scheduling the tasks appears to be an important issue for efficiency of the decoding method, since it greatly contributes to obtaining an even workload of the CPU cores and then fast decoding of the whole bit-stream 20.

Estimation of the decoding costs EDC may be based on the unit information UI for each data unit to be processed.

In step S250 following step S240, running the tasks on their assigned cores is performed to decode the encoded data units in parallel. In a context of a multi-core architecture, this makes it possible to run as many tasks in parallel as there are available CPU cores. In this architecture, it is checked that all CPU cores always have a task to execute, until the end of the entire decoding. This promotes an even workload between the CPU cores.

Once all independent tasks T have been processed in parallel for decoding the encoded data units, the decoded data units are post-processed at step S260.

This may consist in rearranging the data to be sent through a streaming API or to build a tree representation, such as a DOM tree. This may particularly concern rearranging the decoded values of data units with decoded structured data to obtain decoded structured data, e.g. an XML file.

As illustrated below, post-processing may also be used to resolve unresolved dependencies that make the data units not totally independent from each other.

Once post-processing has finished, the bit-stream is completely decoded and structured data, such as an XML file, are obtained.

At step S270, the decoded structured data are then sent to an application for processing.

For the purposes of more detailed description of the invention, the following description concentrates on an EXI bit-stream resulting from encoding XML data using the pre-compression or compression mode.

General steps of a decoding method according to the invention for decoding such an EXI bit-stream are described with reference to FIG. 3.

Step S300 is similar to step S200 for obtaining the EXI bit-stream 20 to be decoded.

In step S310, the decoder decodes the structure channel 12 of the bit-stream to obtain a data structure of the encoded structured data.

Decoding the data structure channel 12 of the bit-stream 20 enables the value channels 14 (i.e. the data units) in the bit-stream to be identified since the value channels are placed in the order of the corresponding qname in the structure.

Identification of the value channels, as part of unit information UI, includes the retrieval of their starting positions P in the bit-stream.

In step S310, other unit information UI required by the decoding of the value channels is obtained, such as a bit-size S of indexing references IR comprised in the encoded data units 14, the indexing references making reference to entries of an indexing table IT. The indexing reference refers to an entry or index of an indexing table, and the bit-size may be the encoding size of global or local string indexes according to the EXI recommendation.

One way to obtain this other unit information is to know, for each value channel 14, the number of strings that are decoded in a literal mode. This allows computing of the size GS of the global indexing table GIT at the start of decoding a value channel. It may thus be derived the global index bit size S=⌈ log 2(GS)⌉.

Computation of the unit information UI is detailed below with reference to FIGS. 4 and 5.

In step S320, the value channels 14 are retrieved based on their positions P in the bit-stream 20.

In step S330, a decoding task T is created for each retrieved value channel or group of values channels (since the EXI recommendation allows grouping of value channels as explained above).

In step S340, the decoding tasks T are assigned to CPU cores of the multi-core decoder, based on estimated decoding costs EDC of the corresponding value channels.

The assignment of the created decoding tasks to the cores may be made in decreasing order of the estimated decoding costs, so that the most demanding tasks are decoded first. A scheduler as introduced above is used to ensure appropriate scheduling of the tasks through the various CPU cores.

In step S350, the decoding tasks are run in parallel on the available CPU cores, using the previous task scheduling. This provides decoding of the value channels.

In the present situation where an EXI bit-stream is being decoded, this step requires specific decoding of strings as described below with reference to FIG. 6. String decoding gives rise to difficulties in handling local and global indexing references.

Since EXI encoding uses indexes to encode strings, decoding of an encoded data unit is provided that comprises resolving indexing references IR to entries of an indexing table IT, said indexing table being specific to said encoded data unit. This is the case of the local indexing, since a local indexing table is created for each qname, i.e. for each value channel 14.

Generally, there is global and local indexing. Thus, an encoded data unit may comprise indexing references GIR to entries of a global indexing table GIT that is common to the entirety of the encoded structured data and indexing references LIR to a local indexing table LIT that is specific to the encoded data unit (in the EXI recommendation, it is specific to a qname).

Sometimes, during the decoding of each value channel, some referenced strings (i.e. strings that have been encoded using an index of an indexing table) may not be available in the indexing table at the time they are decoded. They are called "unresolved indexing references" for the remainder of the explanation.

This is mostly the case for the global indexing since the value channels are not necessarily decoded in the same order as they are organized in the bit-stream. Most of time, the unresolved indexing references UIR are exclusively indexing references GIR to the global indexing table GIT.

This may also occur for the local indexing, where a value channel 14 is split into several decoding tasks because of its large size. Therefore, it may be that some of the unresolved indexing references UIR are references to the global indexing table GIT, and some of the unresolved indexing references UIR are references to the local indexing table LIR.

To cope with that difficulty, the unresolved indexing references are preferably stored during the decoding of the encoded data units. In particular, this may be provided through storing a location of the unresolved indexing references (within the bit-stream or the value channels) during the decoding of the encoded data units.

Following step S350, step S360 of post-processing the encoded data units (or value channels) is performed to resolve indexing references unresolved during the decoding of the encoded data units. This enables an entirely decoded bit-stream to be obtained.

The post-processing is preferably performed when each decoding task has been executed, because resolving unresolved indexing references of an encoded data unit is based on indexing tables formed during the decoding of other encoded data units (other value channels).

After resolving the unresolved indexing references (i.e. after step S360), the decoded data are sent at step S370 to an application for further processing.

A description is now given of the computation of the unit information UI used to correctly identify the value channels 14 and decode them.

FIG. 4 illustrate such computation performed at the encoder when encoding structured data such as XML data, to obtain the bit-stream 20 to be decoded. In this case, the unit information UI is provided to the decoder by the encoder of the encoded structured data of the bit-stream. This lightens the processing operations at the decoder.

Figure 5:
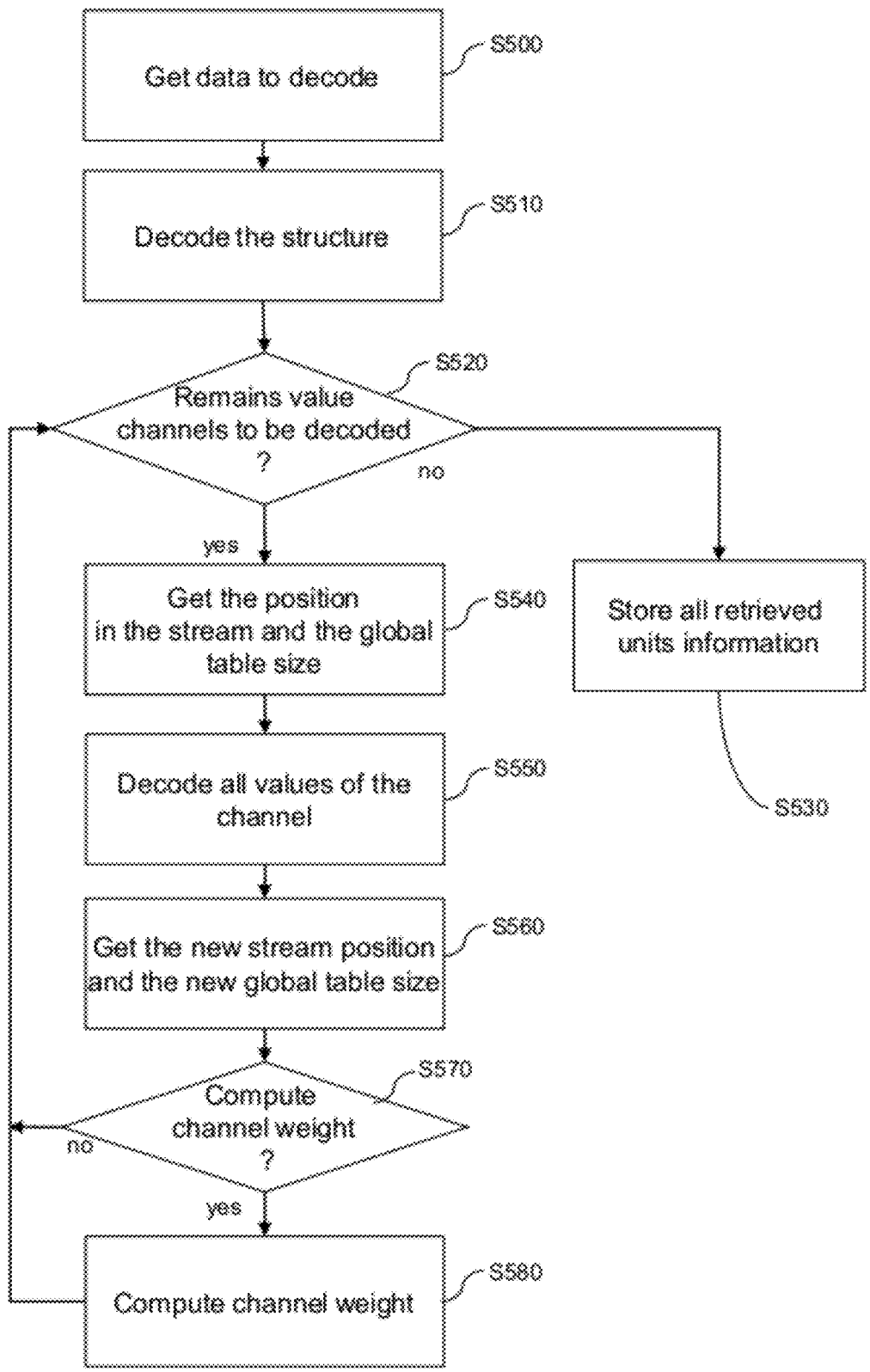
FIG. 5 illustrates, with a flow diagram, steps for computing the unit information according to the invention, at the decoding side.

On the other hand, FIG. 5 illustrates such computation performed at the decoding side. In this case, the unit information is self-obtained by the decoder during a previous decoding of the encoded structured data. This approach is particularly adapted to multi-decoding of the same data. In such a case, the unit information is computed during a first decoding and are used afterwards for the other decoding. Furthermore, this approach makes the decoder totally autonomous to perform parallel decoding according to the invention.

With reference to FIG. 4, the structured data to be encoded, such as XML data, are obtained by the encoder at step S400.

As specified above for the EXI coding using a (pre)) compression mode, the data structure forming the structure channel 12 is first encoded as an encoded structure channel, at step S410.

The process then iterates to encode each value channel 14 (test S420), until no value channel remains to be encoded. In such a case, the process ends at step S430.

For each current value channel or value sub-channel ? it may be noted that according to the EXI recommendation, a value channel may be split into value sub-channels if it is considered to be too large ? the encoder gets the current position P in the bit-stream (the encoding being linear, one channel after the other) and gets the current number GS of values in the global indexing table GIT before encoding the current value (sub)channel, at step S440. The current position P and the current number GS of values in the global indexing table at that time may be used to form, in the present example, the unit information UI associated with the current value channel 14.

In other words, the unit information UI indirectly comprises the bit-size S of the indexing references IR comprised in the encoded data units 14 (e.g. the encoded value channels), the indexing references making reference to entries of an indexing table IT, since the bit-size of indexing references for an encoded data unit may be calculated on the basis of the size GS of the corresponding indexing table IT just before processing the encoded data units in linear processing of the bit-stream.

The encoder encodes all the values of the current value (sub) channel in step S450 according to conventional mechanisms of the EXI encoding, and adds (enqueues) the encoded structured data to the bit-stream being built. It may be recalled here that this encoding implements indexing values IR, such as string values, using indexing tables IT, such as global and local indexing tables GIT/LIT.

The encoder then retrieves the new position P in the bit-stream 20 and the new number GS of values in the global indexing table GIT, at step S460.

Thereafter, in step S470, the encoder sends to the decoder, as unit information associated with the current value channel (i.e. the information obtained at step S440), the difference between the positions and the difference between the numbers GS computed at steps S440 and S460. The decoder can therefore store this unit information (for each value channel) and retrieve it for identifying the data units in the bit-stream and for obtaining the unit information required for the decoding (i.e. at step S210 or S310).

As a variant, only the position P and the size GS computed at step S440 (step S460 can therefore be omitted) are sent. This forces the decoder to perform additional processing to obtain the above differences which reflect the number of values in the channel and the number of newly indexed values in that channel.

Various implementations for the sending of the unit information may be implemented in the context of the invention.

According to one implementation, the encoder has two communication links with the decoder. A first one is used to send the encoded structured data as obtained at step S450. A second one is used to send the unit information. In this case, the encoder directly sends both the unit information and the encoded data to the decoder.

This allows the decoder to start processing the data and to run parallel decoding tasks as early as possible.

According to another implementation, the encoder stores all the unit information as it is gathered from steps S440 and S460 for each value channel. The encoder then adds the gathered unit information as extension information into the encoded bit-stream, for example within the header of the encoded structured data.

This requires the encoder to store the entirety of the encoded data but allows the decoder to access the unit information right from the start of the decoding process.

According to another implementation, the encoder stores the encoded structured data in an archive, such as a zip archive, and places the unit information as a separate file within the zip archive. This is particularly adapted to print orders that use the XPS format.

Referring now to FIG. 5, the computation of the unit information UI at the decoding side comprises a first step S500 of retrieving the encoded structured data (i.e. the bit-stream 20) to be decoded.

In similar manner to conventional decoding, the structure channel 12 is first decoded at step S510. Given the properties of the structure channel in an EXI bit-stream, this decoding enables a list of the value channels in the bit-stream to be retrieved, i.e. a list of the encoded data units to be decoded.

The process then iterates on each value channel to decode them (test at step S520) until no further value channel remains to be decoded. In such a case, the process ends at step S530 with storage of all the unit information for all the value channels.

Each encoded value channel 14 is processed sequentially, one after the other, as in a conventional decoding process.

At the beginning of the decoding of a current encoded value channel 14, the decoder retrieves the current position P in the bit-stream and the global indexing table size GS, at step S540. This is possible since sequential decoding of the whole bit-stream 20 is performed: the global indexing table GIT is progressively constructed, while the bit-stream is linearly consumed as the value channels are decoded.

Current position P and global indexing table size GS form part of the unit information UI corresponding to the current value channel 14.

The current position is the position, in the bit-stream, of the beginning of the current value channel to be decoded.

The global indexing table size GS is the size of the global indexing table GIT just before processing the current value channel, i.e. at the end of decoding the previous value channel. The size of the global indexing table may be a number of entries in the table, or the greatest index value.

Following step S540, the values of the current value channel 14 are all decoded using conventional mechanisms, at step S550. Decoded data are thus obtained, similar to the value channel 14 before encoding. It may be noted that, in addition to the global indexing table GIT, a local indexing table LIT is used to resolve local indexing references LIR that have been used for encoding this value channel.

The new current position in the bit-stream and the new global indexing table size may be obtained at step S560 if it is intended to obtain, as unit information UI, the position difference and the number GS difference as set above between the beginning and the end of decoding the value channel. Otherwise, step S560 may be omitted.

In a variant, instead of retrieving the global indexing table size at step S560, the number of literal strings decoded during step S550 may be obtained. This is because this number represents the number of entries (indexes) that are created during step S550 in both the global and local indexing tables.

This number permits, at step S540 of the following iteration, to compute the current global indexing table size from the global indexing table size of the preceding iteration.

As an option, the method can further provide a step of computing, for the current value channel, a channel weight or "unit weight" UW. In this case, the unit weight forms part of the unit information UI corresponding to the current value channel 14. To that end, step S570 checks if the option is activated. If this is not the case, the process iterates to the next remaining value channel 14.

If this is the case, step S580 is carried out to compute the unit weight UW. This computation is typically done if the current value channel has a large size or if the decoding time estimation (EDT, which is an embodiment of the estimated decoding costs) of the current value channel is far from the one (DT ? decoding time) measured in the decoding of step S550.

The unit weight UW may be calculated on the basis of the current encoded data unit size, i.e. the value channel size, or on the basis of a difference between an estimated decoding time EDT of the current encoded data unit used for step S550 and the corresponding exact decoding time DT occurring in step S550. This may be a ratio between the exact decoding time and the estimated decoding time, such as DT=UW.EDT.

Once all value channels have been processed, the unit information UI obtained at steps S540, S560 and S580 is stored, for example in the header of the stored decoded structured data or as a separate file. As explained above, the unit information may comprise a position or a position difference, a number of literal values (or as an alternative the global indexing table size) or a number difference, and weight information.

Figure 6:
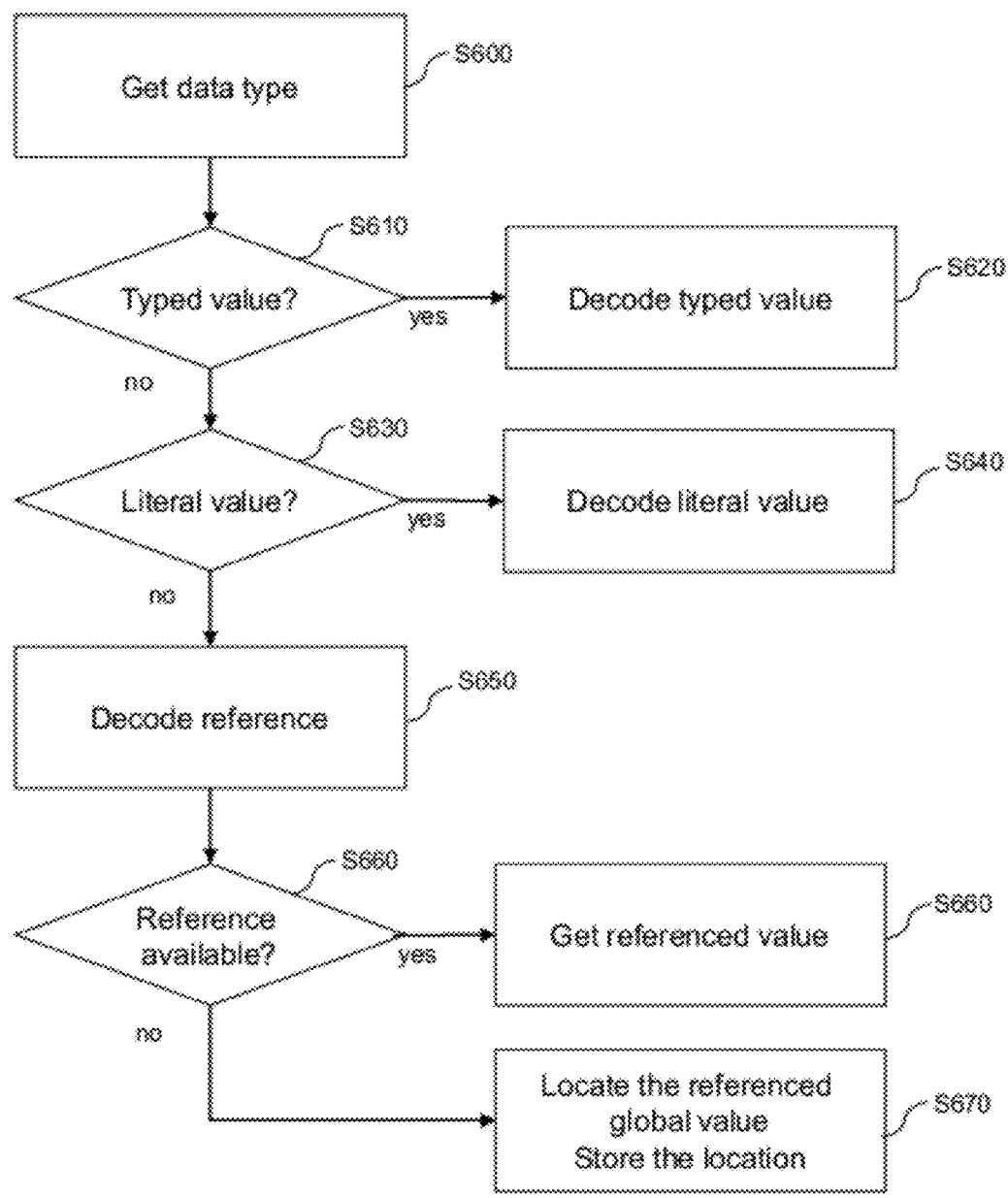
FIG. 6 illustrates, with a flow diagram, steps of decoding values of a value channel in the context of the parallel decoding of FIG. 3.

FIG. 6 illustrates the decoding of EXI values of the value channels 14 during execution of a task T (see S250 and S350).

It is recalled here that depending on the use of an XML Schema to define the encoding types of the XML values, the encoded values may correspond to various encoding types such as integer, Boolean, float, string, etc., or may all be considered as string values (in case no XML schema is considered). The encoding type of a value may therefore be retrieved using both the XML Schema and the structure data resulting from the decoding S310 of the structure channel. However, generally the same encoding type is used for all the values of the same value channel. In this case, the encoding type is retrieved only once for the whole value channel. The process of decoding the EXI values starts at step S600 by obtaining the type of the current value to be decoded.

At step S610, it is checked whether the obtained type is a string. The invention may determine a greater number of specific types to provide specific processing. The present description concentrates on the string type, since the EXI recommendation provides a specific indexing mechanism (through local and global table) for strings. EXI coding enables easy retrieval of the type based on the encoded data in the bit-stream.

In case the value is not of the string type, it is decoded at step S620 using the conventional mechanisms for EXI decoding.

If it is of the string type, it is determined whether the value has been encoded using a literal encoding, at step S630.

If this is the case (first occurrence of the value meaning that it corresponds to a new index/entry of the indexing table), the value is literally decoded at step S640 using conventional mechanisms, and an index is created in the local indexing table LIT associated with the current value channel and simultaneously created in the global indexing table GIT using the next available index. If not, it means that the value has been encoded using an index of an indexing table IT. In this case, the indexing reference IR (i.e. the encoded data in the bit-stream) is decoded at step S650 to obtain the value of the corresponding index.

At step S660, it is determined whether this reference IR is available. In other words, the decoder determines whether the index already exists in an indexing table IT. This applies for both the local and global indexing tables.

For example, the reference already exists in the indexing table if the first occurrence of the corresponding value has been appropriately identified and literally decoded (which leads to adding the corresponding index to the table) during decoding of a previous value.

Usually, there is no difficulty for the local indexing table since it is specific to a value channel and is therefore built from scratch solely from the decoding of a current value channel.

If the reference is available (i.e. the index already in the indexing table), the decoder retrieves the referenced value in the indexing table, at step S670. The reference is then considered to have been resolved. The referenced value is the decoded value.

Otherwise, the referenced value has not yet been decoded. The reference is named "unresolved reference". In such a case, the decoder locates the unresolved referenced global value in the bit-stream 20 and stores this location, at step S680.

The issue regarding unavailable or unresolved references is particularly important with global indexing references GIR, but may also arise with local indexing references LIR, since a value channel may be split into several decoding tasks if too big.

In such a case, the decoder knows the global indexing table size GS exactly from the unit information UI (obtained at step S310). Therefore, it is able to compute the global index GIR of a referenced value from its local index LIR for a given value channel: GIR=GS+LIR.

Given this ability, provision may be made for translating an unresolved local indexing reference ULIR into an unresolved global indexing references UGIR, and wherein post-processing resolves translation-obtained unresolved global indexing references.

This allows the decoder to only handle unresolved global indexing references, at step S360.

Generally, once the global table index is known, it is easy to retrieve the referenced string. Either the global indexing table GIT is built by the independent tasks run in parallel, or each task builds its own local indexing table LIT, and the global indexing table GIT and global index GIR are computed from the local index value LIR and the global indexing table size GS at the starting point of each decoding task.

By default, the global indexing table size GS is not bounded, meaning that there is no limit of the number of global indexes at the same time, and the index and corresponding entry in the table have the same position.

However, in some cases it may be bounded by a certain limit M. When the maximum allowed size is reached, the oldest string is replaced by the newest string in the global indexing table GIT. This allows good string indexing while capping the maximum table size M.

In such cases, the computation of the string location within the global indexing table GIT is slightly more complex. First, the decoder needs to compute the number N of all decoded strings so far. This number starts from 0 with the decoding of the bit-stream and is incremented at each new index created.

Next, starting from the decoded global index ID, the referenced string is located at the Xth entry of the global indexing table GIT, where X=N?M+ID. Knowing X, the decoder can then resolve the reference of the value as if the global indexing table was not bounded.

The scheduling of the independent tasks will now be described. This includes efficiently assigning the tasks, in the right order, to the CPU cores.

FIG. 7 shows several graphs presenting the decoding time DT for decoding all the value channels 14 of a given EXI bit-stream 20.

Figure 7A:
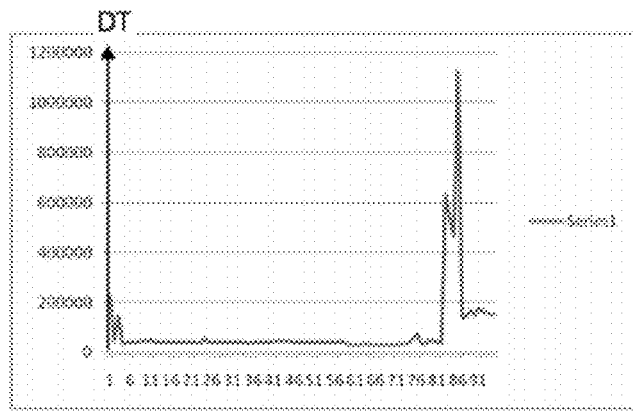
FIG. 7 shows four graphs illustrating the decoding time for decoding value channels of an EXI bit-stream, according to a conventional order of the value channels, a theoretical order and several orders according to embodiments of the invention.

FIG. 7A illustrates such decoding time when the value channels are considered in the same order as specified in the structure channel (i.e. in the same order as in the bit-stream). It is usual that the most decoding-time-consuming value channels are located at the end of the bit-stream. This causes a potential issue of leaving some of the CPU cores without anything to do, while the final most demanding value channels are decoded by a few CPU cores.

Figure 7B:
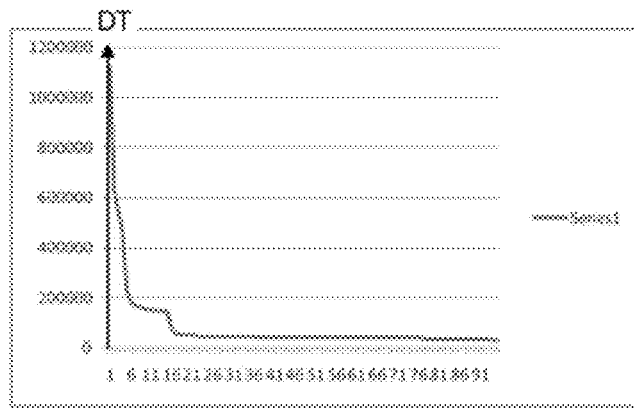

FIG. 7B illustrates the same decoding time but in a perfect decreasing order of the decoding time per value channel. The most demanding value channels are decoded first.

The inventors have observed that, in the case of 3 CPU cores, the overall time is decreased by 20% by parallel decoding of the value channels in decreasing order (FIG. 7B), compared to the natural decoding order (FIG. 7A). This mainly results from the fact that the workload is not equally shared between all 3 CPU cores using the natural order, in particular for the last value channels to be processed, while it is better shared between the CPU cores with the decreasing order.

The higher the number of CPU cores, the higher is the risk for the CPU cores to be starved of data. For purposes of illustration, it has been observed that, with the same EXI document and an 8-available-core decoder, the overall time for decoding the EXI document is decreased by about 50% with the optimised order of FIG. 7B.

However, it is not an easy task to provide a perfect decreasing order of the decoding time, in particular because the decoding times are not exactly known in advance.

Provision is therefore made to use a first criterion for ordering the value channels 14 and corresponding tasks T. This first criterion is the number of bytes that each decoding task is about to process, i.e. more or less the number of bytes of the value channel to be decoded.

Figure 7C:
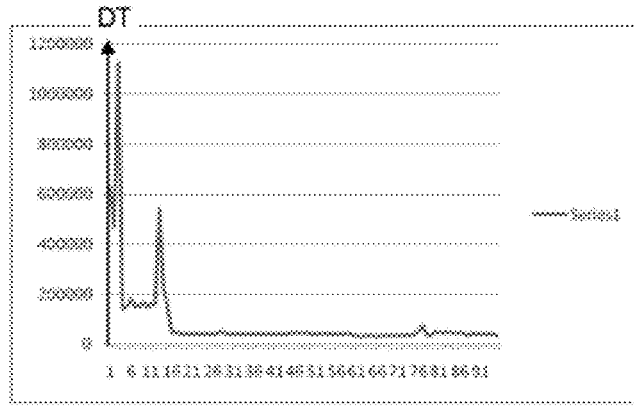

In this respect, FIG. 7C illustrates an example of the decoding time with an ordering of the decoding tasks according to the number of bytes processed by the decoding tasks T. Clearly this ordering is much better than the natural one, though not optimal compared to the theoretical one of FIG. 7b.

Figure 7D:
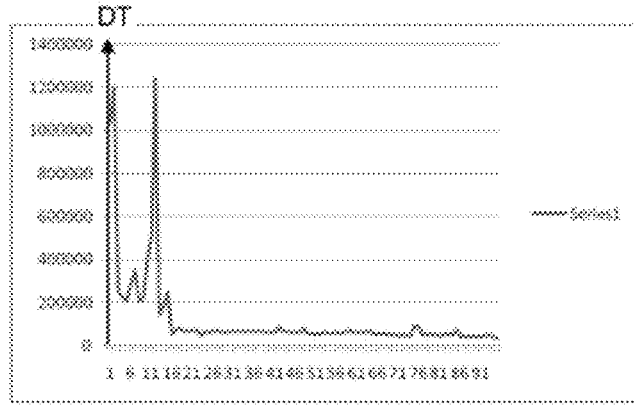

FIG. 7D shows the same graph (decoding time ordered according number of bytes) when an XML Schema is used. The slight differences between FIG. 7C and FIG. 7D may result from the fact that the XML Schema allows use of encoding types for values such as strings, floats, integers, etc.

Based on the analysis of these four FIGs, it is apparent that there exists an efficient way to schedule the tasks T, and then to assign them to CPU cores in an appropriate order. In this case, the estimated decoding costs EDC used in steps S240 and S340 may result from estimating the number of entries or bytes composing the encoded data units, i.e. the value channels.

However, in a variant, provision may be made for estimating a decoding time EDT for the encoded data units, as estimated decoding costs.

In a hybrid approach, the decoding time is estimated as being an estimated decoding cost for encoded data units having a number of entries or bytes greater than a threshold value (e.g. the threshold value may be equal to 1.5/N of the overall data, where N is the number of available cores), and the number of entries or bytes composing the encoded data units is used as an estimated decoding cost for the other encoded data units. This allows refined estimation of only the large encoded data units, for example units that each comprises more than 1.5/N of the overall data, N being the number of available cores. Regarding estimation of the decoding time, it appears that the decoding speeds for each encoding type (integer, float, string, etc.) greatly vary.

As an example, binary data decoding speed is usually very high, integer decoding speed being slower, and float decoding speed being even slower (almost three times slower than for integers).

In addition to the pure decoding speed, the storage or processing of the decoded data may also greatly vary depending on implementation. For instance, decoders may decide to convert all their typed values into an XML string representation. In such a case, the overall decoding time is the addition of the pure bit decoding task time and the translation task time to translate a typed value into a string value.

The same principle is also applicable for string values: the per-byte speed of decoding indexed strings is notably different from the per-byte speed of decoding literal strings. Therefore, depending on the exact implementation and the exact decoding platform, the per-byte decoding speed may greatly vary for each type.

It should be noted that generally, the speed for typed-encoding is fairly stable and can be reasonably well predicted for a given implementation on a given platform.

For example, per-byte speed is generally higher for long string values than for small string values. The decoding time for a single value may thus be represented as a fixed time plus a byte-variable time.

For integers, the byte-variable cost consists in actually reading the bytes and the fixed cost consists in storing the integer value and potentially converting the integer value in its XML string representation.

For indexed strings, the variable cost includes reading the index and the fixed cost includes retrieving the values in the indexing tables.

Figure 8:
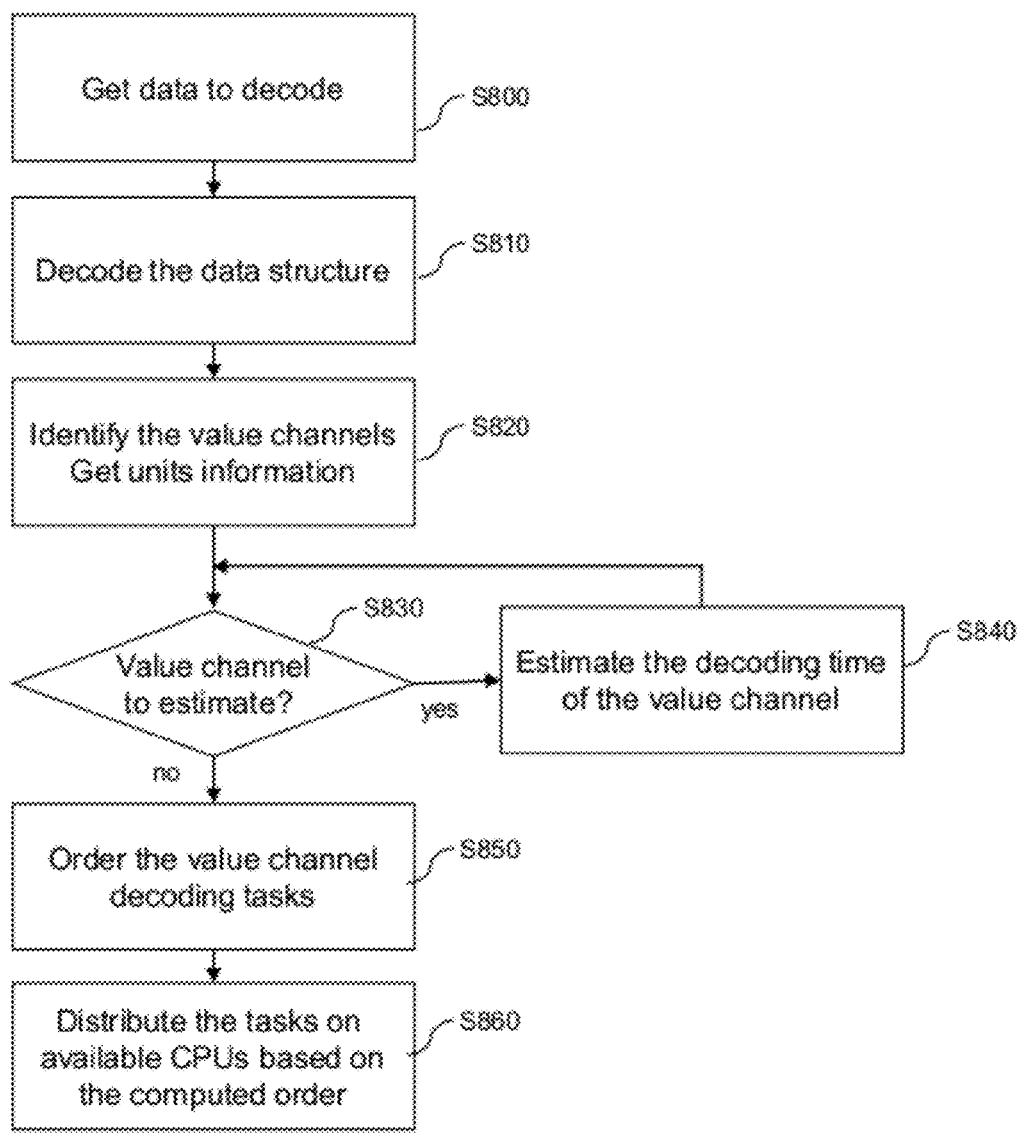
FIG. 8 illustrates, with a flow diagram, steps for scheduling decoding tasks for CPU cores of a multi-ore decoder, according to an embodiment of the invention.

FIG. 8 illustrates the operations of a scheduler according to an embodiment of the invention. In this example, the scheduler uses the data structure of the structure channel 12 to estimate the value channel decoding tasks T.

The operations start at step S800 to obtain the bit-stream 20 of encoded structured data to be decoded.

At step S810, the decoder obtains the associated data structure. This is for example the data structure obtained from decoding the structure channel 12 in step S310. The data structure makes it possible to identify the value channels 14 in the bit-stream, since they are ordered according to the structure data.

The decoder then obtains the unit information UI for all the value channels, in step S820 similar to step 310. This enables the decoder to obtain the value channels from the bit-stream.

The decoder then considers each value channel after the other in order to estimate, if appropriate, a corresponding decoding time EDT.

At step S830, the scheduler determines if there remains a value channel 14 that has to be estimated. For example, as suggested above for the hybrid approach, a criterion based on a sufficiently large number of bytes or values (1.5/N of the overall data) in the value channel may be used. In this case, only the "large" value channels have a corresponding decoding time that is estimated at step S840. An exemplary estimation of the decoding time EDT for a value channel 14 is detailed below with reference to FIG. 9.

Once all value channels have been checked, the scheduler places in order the value channel decoding tasks T at step S850.

Advantageously, the estimated value channel decoding tasks T are placed in decreasing order of the decoding times EDT of their corresponding value channels 14.

Furthermore, the decoding tasks corresponding to the value channels that have not been estimated are enqueued after the estimated value channel decoding tasks, following a number-of-entries or byte-size order.

In a particular approach aimed at reducing the number of independent tasks, the value channels that have not been estimated are grouped together in at least one task. The grouping may be limited with a maximum allowed number of bytes in the resulting group. This prevents production of tasks with a long decoding time that may disadvantageously occur at the end of the decoding.

After step S850, the decoding tasks T are successively distributed to the available CPU cores by the scheduler, at step S860. The distribution is of course made according to the order computed in step S850.

Figure 9:
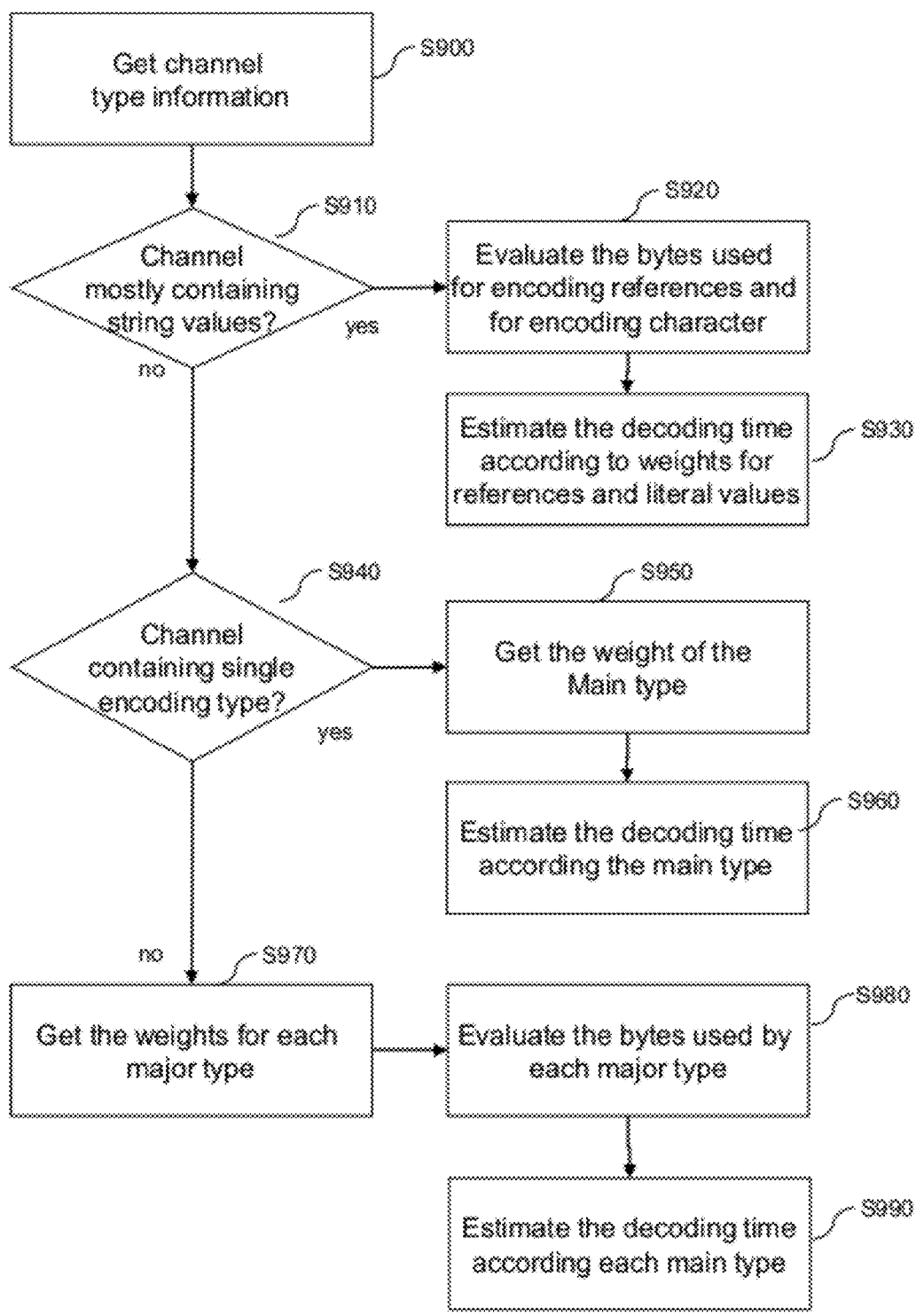
FIG. 9 illustrates, with a flow diagram, steps for estimating a decoding time for value channels, according to an embodiment of the invention.

FIG. 9 illustrates computation of an estimated decoding time EDT for a given value channel 14, for the specific case of an EXI bit-stream to be decoded where string values have particular concerns.

This starts with step S900 where the encoding types of the values of the current value channel are retrieved. This information is available from the structure data, possibly using an XML Schema.

In a first test S910, it is checked whether or not the channel values are encoded mostly or uniquely as strings. Such a case often occurs, in particular when no XML Schema is available. A value channel may be considered as mostly containing string values if more than 90% of its values are string values. In that case (output 'yes' from test S910), the unit information UI enables the number N_L of values encoded as literals to be obtained.

Given the number of values to be decoded by the channel, the number N_R of strings encoded as references is also computed.

The number N_I of bytes used to encode the indexes and the number N_C of bytes used to encode the value characters are also estimated.

Estimation or computation of N_R, N_I, N_L and N_C is carried out at step S920.

Based on those numbers, the decoding time estimation EDT is computed, using formula such as: EDT=Wfr*N_R+Wbr*N_I+Wfl*N_L+Wbl*N_C, where Wfr is a predefined fixed weight for references, Wbr is a predefined byte weight for references, Wfl is a predefined fixed weight for literal strings and Wbl is a predefined weight for character decoding. These weights are for example configuration information of the decoder.

If the current value channel does not contain mostly string values (output 'no' of test S910), the value channel may contain values with a single encoding type or not, which is checked in test S940.

In case of a positive check, fixed Wf and byte Wb weights (from configuration information of the decoder) of the single encoding type are retrieved in step S950 and the decoding time estimation is computed at step S960 using a formula such as EDT=Wf*Ne+Wb*Nb, where Ne is the number of values of the current value channel (obtained from the structure channel) and Nb is the size in bytes of the single encoding type. Nb can be predefined according to the encoding type: for example integer size is two bytes, float size is four bytes, etc.

On the other hand, if the current value channel contains values with different encoding types (output 'no' from test S940), the process continues at step S970 to obtain fixed Wfti and byte Wbti weights of each encoding type Ti used in the current value channel, configuration information of the decoder.

At step S980, the number Nbti of bytes used by each encoding type is also estimated accurately for some encoding types (the major encoding types, for example those representing 90% of the values) and are evenly distributed for variable-size encodings (binary data).

The decoding time is estimated in step S990 according to the formula:
EDT= where N is the number of encoding types considered, Nti is the number of occurrences of the type Ti (obtained from the structure channel), and Nbti is an estimated size in bytes used in the channel by each encoding type (for example integer size is two bytes, float size is four bytes, etc.).

The above shows how the scheduler obtains estimated decoding time EDT for each value channel 14, and then orders the decoding tasks T for efficient parallel decoding.

Using the above computed information, the scheduler is also able to compute, based on the estimated decoding costs, an optimal number of CPU cores for a given bit-stream to be decoded. This can in particular prevent creating an unnecessary number of threads. Such computation generally seeks to determine a minimum number of CPU cores for the shortest overall decoding time.

In one embodiment of the invention, the scheduler detects tasks T that are too small or too big and, depending on the unit information UI, groups several contiguous tasks together or splits one decoding task into smaller decoding tasks.

In the case of splitting a decoding task into smaller decoding tasks, local indexing references LIR may be missing when decoding the value channels at step S350, in which cases it is envisaged to translate local indexing references into global indexing references as explained above. The resulting global indexing references corresponding to unresolved local indexing references are dereferenced after having decoded all the value channels (i.e. at step S360).

In one particular embodiment of the invention as introduced above, the decoding method comprises decoding a data structure channel 12 of the bit-stream 20 to identify a block Bi of structured data, for example a section of the structured data between a specified start tag and end tag pair, for instance a page, and decoding the encoded structured data corresponding to the identified block, wherein decoding the encoded structured data corresponding to the identified block Bi comprises the steps of obtaining, retrieving, creating, assigning and running, wherein assigning is based on estimated block decoding costs for decoding the data of the encoded data units corresponding to the identified block, and wherein decoding the encoded data units comprises solely decoding the data of the encoded data units corresponding to the identified block.

In this embodiment, only the necessary information may be decoded for each block. One advantage is that each block (e.g. each page) is decoded more quickly, while allowing a parallel decoding of the next block to be started.

Figure 10A:
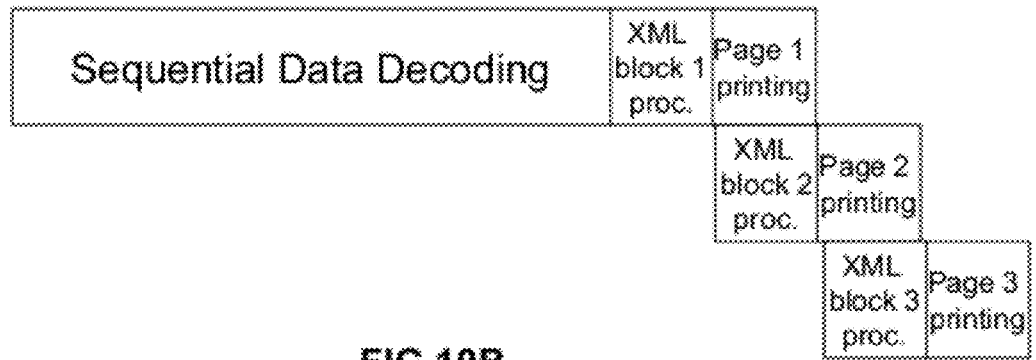
FIG. 10 illustrates, over time, the decoding time improvements according to the invention, in a general embodiment of the invention in a by-block approach of the decoding according to the invention.
Figure 10B:
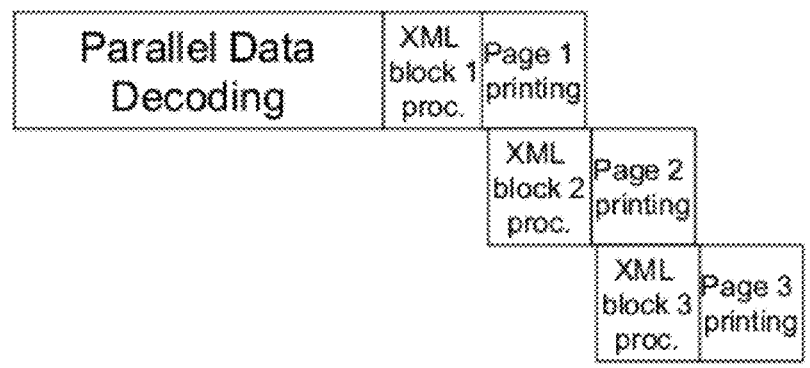
Figure 10C:
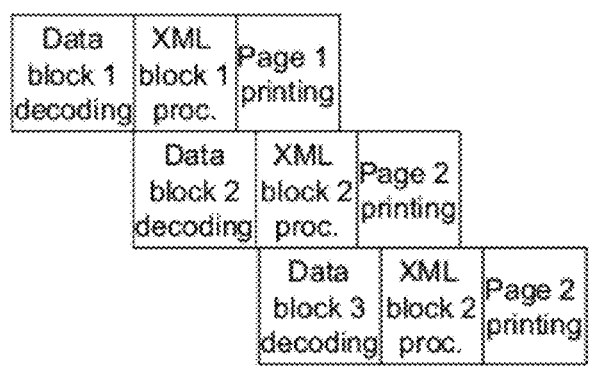

FIG. 10 illustrates this advantage by comparing a sequential decoding operation according to conventional mechanisms (FIG. 10A), a parallel decoding operation as explained above without implementing the by-block approach (FIG. 10B), and a parallel decoding operation implementing the by-block approach (FIG. 10C). This may correspond to decoding a document, such as an SVG or OOXML document, that is printed page by page.

FIG. 10A describes the standard case of sequential data decoding followed by a pipelined print. The data is first decoded and then sent to the printing application. The application processes the decoded data block by block, typically page by page.

FIG. 10B presents the case where the decoding is made in parallel using several CPU cores as explained above. As presented in this figure, the decoding is made faster which improves the overall processing time.

FIG. 10C presents the case of data decoding being split into data block decoding: the parallel decoding processor decodes only the necessary information for the individual pipeline process of each block. Typically, the parallel decoding processor decodes all data needed for a page, sends this data block to the printing application so that it can process it, and starts in parallel the decoding of a following page.

In this case, the three pipelined processes (decoding, processing and printing) are carried out in parallel on different data blocks Bi, providing an overall increase in decoding and processing speed.

FIG. 11 illustrates an implementation of this parallel decoding using a by-block approach.

At step S1100, the bit-stream 20 of encoded structured data is retrieved.

The decoding of the bit-stream 20 is performed block by block (e.g. page by page). In this respect, the decoding process iterates on each block Bi as shown by the loop between S1190 and S1100.

At step S1110, the data structure (represented by the encoded structure channel 12) is decoded until the end of a current block Bi is reached, for example as soon as a  end tag is reached. However, other criteria for detecting an end of a block may be implemented, depending on the application. In particular, the end of a block may be determined by the decoder according to its resources (e.g. memory allowing a block of limited size to be processed).

Once the data structure of a block is known, the value channel blocks are identified and the value channels are retrieved from the bit-stream (step S1120), as explained previously.

Decoding tasks T are therefore created for the retrieved value channels 14 at step S1130.

At step S1140, the decoding tasks are placed in order as explained above and assigned to CPU cores by a scheduler similar to the one detailed above.

However, since only some of the values (corresponding to the block Bi) are needed, a decoding time EDT of each value channel 14 may be estimated specifically for the block Bi. The corresponding decoding time/cost estimation for the block is referred to below as "estimated block decoding cost/time". An estimated block decoding cost (time) may be calculated from the estimated decoding costs (time) of the whole corresponding encoded data unit.

For example, if the total number of values is known for the current value channel, the block decoding time for the value channel can be estimated as if it was a value channel with a byte size equivalent to Nbc*Neb/Nec, where Nbc is the number of bytes of the current value channel, Neb is the number of entries of the block in the current value channel and Nec is the number of entries of the current value channel. In this case, the estimated block decoding time may be equal to Nbc*Neb/Nec*EDT, where EDT is the estimated decoding time for the whole value channel.

The number of channel entries can be known if the whole structure channel is decoded in one go or as unit information.

As a variant, if this number is not known, the decoding time can be estimated from the decoding time of previously decoded blocks of the same value channel as EDTi=EDTi-1*Ni/Ni-1, where Ni is the number of entries of the current block and Ni-1 is the number of entries of the last decoded block of the same value channel, EDTi-1 is the decoding time measured from the last block.

Other predictions based on history may also be used.

Returning to FIG. 11, following step S1140 (the channel block decoding tasks are created and placed in order for scheduling), the decoding tasks T are run in parallel on the available CPU cores at step S1150. Decoded values are thus obtained.

Once all values have been decoded for the current block, the global indexing references GIR are resolved at step S1160 as previously disclosed.

Indeed, since not all value channels have not yet been decoded, some global indexing references may be missing at that time and thus be unresolved.

In one approach, decoding block by block is continued until the indexing references of a block are all available. In this case, the decoder checks whether the references of decoded blocks have been processed (step S1170) in which case the decoder sends all the finalized blocks to the application that will process them (step S1180).

The decoder then switches to the decoding of a following block (step S1190) until the end (step S1200). This approach is quite efficient in most cases.

However, it may fail to actually send the blocks as soon as possible. This is because, for some documents, a global indexing reference may be decoded during the decoding of the last block, which will make the by-block approach lose its advantage.

In this respect, when an encoded data unit comprises indexing references IR to entries of an indexing table IT, adaptation of this decoding process may be implemented.

In particular, decoding the encoded structured data corresponding to the identified block Bi further may comprise, after decoding the encoded data units:
post-processing the encoded structured data to resolve indexing references unresolved during the decoding if the encoded data units,
obtaining the locations, in the bit-stream 20, of indexing references corresponding to indexing references unresolved during the post-processing, using the decoded data structure channel,
using the obtained locations, configuring the decoder to provide decoding of the located indexing references during decoding of a following block of structured data. This ensures that a given block is totally decoded when decoding values of the next block ends.

Still referring to FIG. 11, this adaptation provides decoding of the entire structure channel 12, at step S1110.

Next, during step S1160, the decoder locates the position of the unresolved global indexing references UGIR of the current block Bi that cannot be further resolved at this step. These positions are specified within the data to be decoded for the next bloc Bi+1, so that when decoding the values of block Bi+1, the decoder includes the decoding of all the global indexing references needed by block Bi. This process ensures that at the end of the values decoding of block Bi+1, the block Bi is ready to be sent in steps S1170 and S1180.

With reference to FIG. 1F, a description is now given by way of example of a particular hardware configuration of a device for decoding a bit-stream of encoded structured data adapted for an implementation of the method according to the invention.

An information processing device implementing the present invention is for example a micro-computer 50, a workstation, a personal digital assistant, or a mobile telephone connected to different peripherals. According to another embodiment of the invention, the information processing device takes the form of a camera provided with a communication interface to enable connection to a network.

The peripherals connected to the information processing device comprise for example a digital camera 64, or a scanner or any other means of image acquisition or storage, connected to an input/output card (not shown) and supplying multimedia data, possibly in the form of EXI bit-stream, to the information processing device.

The device 50 comprises a communication bus 51 to which there are connected:
- a central processing unit CPU 52 for example in the form of a microprocessor;
- a read only memory 53 in which may be contained the programs whose execution enables the implementation of the method according to the invention. It may be a flash memory or EEPROM;
- A random access memory 54, which, after powering up of the device 50, contains the executable code of the programs of the invention necessary for the implementation of the invention. As this memory 54 is of random access type (RAM), it provides fast access compared to the read only memory 53. This RAM 54 stores in particular the value channels and the decoded values of the channels progressively with the advancement of the processing operations on the EXI bit-stream;
- a screen 55 for displaying data and/or serving as a graphical interface with the user, who may thus interact with the programs according to the invention, using a keyboard 56 or any other means such as a pointing device, for example a mouse 57 or an optical stylus;
- a hard disk 58 or a storage memory, such as a memory of compact flash type, able to contain the programs of the invention as well as data used or produced on implementation of the invention;
- an optional diskette drive 59, or another reader for a removable data carrier, adapted to receive a diskette 63 and to read/write thereon data processed or to process in accordance with the invention; and
- a communication interface 60 connected to the telecommunications network 61, the interface 60 being adapted to transmit and receive data.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the device for decoding a bit-stream, and which may possibly be removable, is adapted to store one or more programs whose execution permits the implementation of the method according to the invention.

The executable code enabling the device for decoding a bit-stream to implement the invention may equally well be stored in read only memory 53, on the hard disk 58 or on a removable digital medium such as a diskette 63 as described earlier. According to a variant, the executable code of the programs is received by the intermediary of the telecommunications network 61, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 1 to 11, to implement the decoding method of the present invention and constitute the device of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method for decoding encoded markup-language structured data from a bit-stream comprising a plurality of encoded data units comprising:
   obtaining unit information comprising positions of the encoded data units within the bit-stream;
   retrieving the encoded data units from the bit-stream, based on the unit information;
   creating decoding tasks for decoding the retrieved encoded data units; assigning the created decoding tasks to cores of a multi-core decoder in decreasing order of the estimated decoding costs, of the encoded data units, the estimated costs of an encoded data unit being an estimate of at least one of a number of entries or bytes composing the encoded data unit and a decoding time to decode the encoded data unit;
   running the tasks on their assigned cores to decode the encoded data units in parallel; and
   obtaining the markup-language structured data from decoded data units;
   an indexing table including entries that associate indexing references with respective decoded values, a new entry being added to the indexing table upon literally decoding an encoded value of an encoded data unit by associating an indexing reference with the literally decoded value;
   decoding an encoded data unit comprises resolving indexing references of the encoded data unit with entries of an indexing table to obtain decoded values associated with the indexing references in the indexing table and not resolving at least one indexing reference of the encoded data unit because the indexing reference is not yet available in the indexing table at the time it is subject to solving and becomes available in the indexing table by the decoding of another encoded data unit, and wherein the method further comprises, after decoding the encoded data units, post-processing the encoded data units to resolve unresolved indexing references, said resolving using the indexing references made available in the indexing table by the decoding of another unresolved during the decoding of the encoded data units.

2. The method according to claim 1, wherein decoding time is estimated as being an estimated decoding cost for encoded data units having a number of entries or bytes greater than a threshold value, and the number of entries or bytes composing the encoded data units is used as an estimated decoding cost for the other encoded data units.

3. The method according to claim 1, wherein decoding an encoded data unit comprises resolving indexing references to entries of an indexing table, said indexing table being specific to said encoded data unit.

4. The method according to claim 1, further comprising, during the decoding of the encoded data units, storing a location of the unresolved indexing references.

5. The method according to claim 1, wherein an encoded data unit comprises indexing references to entries of a global indexing table that is common to the entirety of the encoded markup-language structured data and indexing references to a local indexing table that is specific to the encoded data unit, and wherein the unresolved indexing references are exclusively indexing references to the global indexing table.

6. The method according to claim 1, wherein an encoded data unit comprises indexing references to entries of a global indexing table that is common to the entirety of the encoded markup-language structured data and indexing references to a local indexing table that is specific to only a part of the encoded markup-language structured data, and wherein part of the unresolved indexing references are unresolved global indexing references to the global indexing table and another part of the unresolved indexing references are unresolved local indexing references to the local indexing table.

7. The method according to claim 6, further comprising translating an unresolved local indexing reference into an unresolved global indexing reference, and wherein post-processing resolves translation-obtained unresolved global indexing references.

8. The method according to claim 1, wherein unit information is provided to the decoder by an encoder of the encoded markup-language structured data of the bit-stream.

9. The method according to claim 1, wherein unit information is self-obtained by the decoder during previous decoding of the encoded markup-language structured data.

10. The method according to claim 1, wherein the encoded data units are value channels of an EXI bit-stream, and the obtaining unit information comprises decoding a data structure channel of the bit-stream to identify the value channels in the bit-stream and obtaining a bit-size of indexing references comprised in the encoded data units, the indexing references making reference to entries of an indexing table.

11. The method according to claim 1, wherein the unit information further comprises a bit-size of indexing references comprised in the encoded data units, the indexing references making reference to entries of an indexing table, and wherein the bit-size of indexing references for an encoded data unit is calculated on the basis of the size of the corresponding indexing table just before processing the encoded data unit in linear processing of the bit-stream.

12. The method according to claim 11, wherein the unit information further comprises, for a given encoded data unit, a unit weight, and wherein the unit weight is calculated during previous decoding of the encoded markup-language structured data, on the basis of the encoded data unit size or on the basis of a difference between an estimated decoding time of the encoded data unit for the previous decoding and the corresponding exact decoding time in the previous decoding.

13. The method according to claim 1, further comprising decoding a data structure channel of the bit-stream to identify a block of markup-language structured data and decoding the encoded markup-language structured data corresponding to the identified block, wherein decoding the encoded markup-language structured data corresponding to the identified block comprises the steps of obtaining, retrieving, creating, assigning and running, wherein said assigning is based on estimated block decoding costs for decoding the data of the encoded data units corresponding to the identified block, and said decoding of the encoded data units comprises solely decoding the data of the encoded data units corresponding to the identified block.

14. The method according to claim 13, wherein an estimated block decoding cost is calculated from the estimated decoding cost of the whole corresponding encoded data unit.

15. The method according to claim 13, wherein an encoded data unit comprises indexing references to entries of an indexing table, wherein decoding the encoded markup-language structured data corresponding to the identified block further comprises, after decoding of the encoded data units:
post-processing the encoded markup-language structured data to resolve indexing references unresolved during the decoding of the encoded data units,
obtaining locations, in the bit-stream, of indexing references corresponding to indexing references unresolved during the post-processing, using the decoded data structure channel,
using the obtained locations, configuring the decoder to provide decoding of the located indexing references during decoding of a following block of markup-language structured data.

16. The method according to claim 15, wherein post-processing for the next block of markup-language structured data resolves indexing references unresolved for the previous block of markup-language structured data, using decoded located indexing references.

17. An apparatus having a processor for decoding encoded markup-language structured data from a bit-stream comprising a plurality of encoded data units, comprising:

a unit configured to obtain unit information comprising positions of the encoded data units within the bit-stream;
a unit configured to retrieve the encoded data units from the bit-stream, based on the unit information;
a unit configured to create decoding tasks for decoding the retrieved encoded data units;
a unit configured to assign the created decoding tasks to cores of a multi-core decoder in decreasing order of estimated decoding costs, of the encoded data units, the estimated costs of an encoded data unit being an estimate of at least one of a number of entries or bytes composing the encoded data unit and a decoding time to decode the encoded data unit;
a unit configured to run the tasks on their assigned cores to decode the encoded data units in parallel; and a unit configured to obtain the markup-language structured data the decoded data units;

a unit configured to create an index table including entries that associate indexing references with respective decoded values, a new entry being added to the indexing table upon literally decoding an encoded value of an encoded data unit by associating an indexing reference with the literally decoded value;

a unit configured to decode an encoded data unit comprises resolving indexing references of the encoded data unit with entries of an indexing table to obtain decoded values associated with the indexing references in the indexing table and not resolving at least one indexing reference of the encoded data unit because the indexing reference is not yet available in the indexing table at the time it is subject to solving and becomes available in the indexing table by the decoding of another encoded data unit, and a unit configured to post-process the encoded data units to resolve unresolved indexing references, after decoding the encoded data units, said resolving using the indexing references made available in the indexing table by the decoding of another unresolved during the decoding of the encoded data units.

18. A non-transitory computer readable storage medium storing computer-executable instructions for controlling an apparatus which, when executed by a computer, cause the computer to perform operations comprising:

obtaining unit information comprising positions of the encoded data units within the bit-stream;

retrieving the encoded data units from the bit-stream, based on the unit information;

creating decoding tasks for decoding the retrieved encoded data units; assigning the created decoding tasks to cores of a multi-core decoder in decreasing order of estimated decoding costs, of the encoded data units, the estimated costs of an encoded data unit being an estimate of at least one of a number of entries or bytes composing the encoded data unit and a decoding time to decode the encoded data unit; and running the tasks on their assigned cores to decode the encoded data units in parallel; and obtaining the markup-language structured data from decoded data units;

an indexing table including entries that associate indexing references with respective decoded values, a new entry being added to the indexing table upon literally decoding an encoded value of an encoded data unit by associating an indexing reference with the literally decoded value;

decoding an encoded data unit comprises resolving indexing references of the encoded data unit with entries of an indexing table to obtain decoded values associated with the indexing references in the indexing table and not resolving at least one indexing reference of the encoded data unit because the indexing reference is not yet available in the indexing table at the time it is subject to solving and becomes available in the indexing table by the decoding of another encoded data unit, and wherein the method further comprises, after decoding the encoded data units, post-processing the encoded data units to resolve unresolved indexing references, said resolving using the indexing references made available in the indexing table by the decoding of another unresolved during the decoding of the encoded data units.

19. The method according to claim 1, wherein each of the data units is made of one or more entire value channels or of a part of only one value channel, each value channel storing values of the markup-language structured data that are associated with structural data having the same identifying name.

20. The method of claim 1, wherein the assigning step assigns the most demanding tasks so that they are decoded first, and enqueues the less demanding tasks in a waiting queue, and, upon having one of the cores ending processing of a previous task, assigns the most demanding task that remains in the waiting queue to the core ending the processing.

* * * * *